United States Patent
Kale et al.

(10) Patent No.: US 11,734,339 B2
(45) Date of Patent: Aug. 22, 2023

(54) GENERATING EMBEDDINGS IN A MULTIMODAL EMBEDDING SPACE FOR CROSS-LINGUAL DIGITAL IMAGE RETRIEVAL

(71) Applicant: Adobe Inc., San Jose, CA (US)

(72) Inventors: Ajinkya Kale, San Jose, CA (US); Zhe Lin, Fremont, CA (US); Pranav Aggarwal, San Jose, CA (US)

(73) Assignee: Adobe Inc., San Jose, CA (US)

( * ) Notice: Subject to any disclaimer, the term of this patent is extended or adjusted under 35 U.S.C. 154(b) by 171 days.

(21) Appl. No.: 17/075,450

(22) Filed: Oct. 20, 2020

(65) Prior Publication Data
US 2022/0121702 A1  Apr. 21, 2022

(51) Int. Cl.
| | | |
|---|---|---|
| *G06F 16/535* | (2019.01) | |
| *G06F 16/538* | (2019.01) | |
| *G06F 16/242* | (2019.01) | |
| *G06F 40/279* | (2020.01) | |
| *G06N 3/08* | (2023.01) | |
| *G06N 3/04* | (2023.01) | |
| *G06F 18/21* | (2023.01) | |

(52) U.S. Cl.
CPC .......... *G06F 16/535* (2019.01); *G06F 16/243* (2019.01); *G06F 16/538* (2019.01); *G06F 18/21* (2023.01); *G06F 40/279* (2020.01); *G06N 3/04* (2013.01); *G06N 3/08* (2013.01)

(58) Field of Classification Search
CPC ..... G06F 16/535; G06F 16/243; G06F 16/538
USPC ......................................................... 707/722
See application file for complete search history.

(56) References Cited

U.S. PATENT DOCUMENTS

| | | | |
|---|---|---|---|
| 10,445,431 B1 * | 10/2019 | Lev-Tov | G06F 16/532 |
| 2018/0232451 A1 * | 8/2018 | Lev-Tov | G06F 16/248 |
| 2020/0250537 A1 * | 8/2020 | Li | G06F 16/9538 |
| 2020/0380298 A1 | 12/2020 | Aggarwal et al. | |
| 2020/0380403 A1 * | 12/2020 | Aggarwal | G06F 18/21 |
| 2021/0297498 A1 * | 9/2021 | Divakaran | G06Q 30/0631 |
| 2021/0349954 A1 * | 11/2021 | Renders | G06F 16/783 |

(Continued)

OTHER PUBLICATIONS

Pranav Aggarwal, Zhe Lin, Baldo Faieta, and Saeid Motiian. 2019. Multitask text-to-visual embedding with titles and clickthrough data.CoRR, abs/1905.13339.

(Continued)

*Primary Examiner* — Kimberly L Wilson
(74) *Attorney, Agent, or Firm* — Keller Preece PLLC

(57) ABSTRACT

The present disclosure relates to methods, systems, and non-transitory computer-readable media for retrieving digital images in response to queries. For example, in one or more embodiments, the disclosed systems receive a query comprising text and generates a cross-lingual-multimodal embedding for the text within a multimodal embedding space. The disclosed systems further identifies an image embedding for a digital image that corresponds to (e.g., is relevant to) the text from the query based on an embedding distance between the image embedding and the cross-lingual-multimodal embedding for the text within the multimodal embedding space. Accordingly, the disclosed systems retrieve the digital image associated with the image embedding for display on a client device, such as the client device that submitted the query.

20 Claims, 11 Drawing Sheets

(56) References Cited

U.S. PATENT DOCUMENTS

2022/0246136 A1* 8/2022 Yang ............... G06N 3/044

OTHER PUBLICATIONS

Mikel Artetxe and Holger Schwenk. 2018. Massively multilingual sentence embeddings for zero-shot cross-lingual transfer and beyond. CoRR, abs/1812.10464.
Iacer Calixto and Qun Liu. 2017. Sentence-level multilingual multimodal embedding for natural language processing. In Proceedings of the International Conference Recent Advances in Natural Language Processing, RANLP 2017, pp. 139-148, Varna, Bulgaria. INCOMA Ltd.
Muthuraman Chidambaram, Yinfei Yang, Daniel Cer, Steve Yuan, Yun-Hsuan Sung, Brian Strope, and Ray Kurzweil. 2018. Learning cross-lingual sentence representations via a multi-task dual-encoder model. CoRR, abs/1810.12836.
Ritendra Datta, Dhiraj Joshi, Jia Li, and James Z Wang. 2008. Image retrieval: Ideas, influences, and trends of the new age.ACM Computing Surveys (Csur), 40(2):1-60.
J. Deng, W. Dong, R. Socher, L. Li, Kai Li, and Li Fei-Fei. 2009. Imagenet: A large-scale hierarchical image database. In2009 IEEE Conference on Computer Vision and Pattern Recognition, pp. 248-255.
Desmond Elliott, Stella Frank, Khalil Simaan, and Lucia Specia. 2016. Multi30K: Multilingual English-German image descriptions. InProceedings of the 5th Workshop on Vision and Language, pp. 70-74, Berlin, Germany. Association for Computational Linguistics.
Spandana Gella, Rico Sennrich, Frank Keller, and Mirella Lapata. 2017. Image pivoting for learning multilingual multimodal representations. In Proceedings of the 2017 Conference on Empirical Methods in Natural Language Processing, pp. 2839-2845, Copenhagen, Denmark. Association for Computational Linguistics.
Xavier Glorot, Antoine Bordes, and Yoshua Bengio. 2011. Deep sparse rectifier neural networks. In Proceedings of the Fourteenth International Conference on Artificial Intelligence and Statistics, vol. 15 of Proceedings of Machine Learning Research, pp. 315-323, Fort Lauderdale, FL, USA. PMLR. 2011. Deep sparse rectifier neural networks. In Proceedings of the Fourteenth International Conference on Artificial Intelligence and Statistics, vol. 15 of Proceedings of Machine Learning Research, pp. 315-323, Fort Lauderdale, FL, USA. PMLR.
Michael Grubinger, Paul Clough, Henning Muller, and Thomas Deselaers. 2006. The iapr tc-12 benchmark—a new evaluation resource for visual information systems.
D. R. Hardoon, S. Szedmak, and J. Shawe-Taylor. 2004. Canonical correlation analysis: An overview with application to learning methods.Neural Computation, 16(12):2639-2664.
Kaiming He, Xiangyu Zhang, Shaoqing Ren, and Jian Sun. 2015. Deep residual learning for image recognition.CoRR, abs/1512. 03385.
John Hewitt, Daphne Ippolito, Brendan Callahan, Reno Kriz, Derry Tanti Wijaya, and Chris Callison-Burch. 2018. Learning translations via images with a massively multilingual image dataset. In Proceedings of the 56th Annual Meeting of the Association for Computational Linguistics (vol. 1: Long Papers), pp. 2566-2576, Melbourne, Australia. Association for Computational Linguistics.
Sepp Hochreiter and Jurgen Schmidhuber. 1997. Long short-term memory.Neural computation, 9:1735-80.
Eva Horster, Rainer Lienhart, and Malcolm Slaney. 2007. Image retrieval on large-scale image databases. In Proceedings of the 6th ACM International Conference on Image and Video Retrieval, CIVR '07, p. 17-24, New York, NY, USA. Association for Computing Machinery.
Po-Yao Huang, Xiaojun Chang, and Alexander G. Hauptmann. 2019. Multi-head attention with diversity for learning grounded multilingual multimodal representations. In EMNLP/IJCNLP.
Yushi Jing, David Liu, Dmitry Kislyuk, Andrew Zhai, Jiajing Xu, Jeff Donahue, and Sarah Tavel. 2015. Visual search at pinterest. InProceedings of the 21th ACM SIGKDD International Conference on Knowledge Discovery and Data Mining, pp. 1889-1898.
Akos Kadar, Desmond Elliott, Marc-Alexandre Cote, Grzegorz Chrupala, and Afra Alishahi. 2018. Lessons learned in multilingual grounded language learning.CoRR, abs/1809.07615.
Donghyun Kim, Kuniaki Saito, Kate Saenko, Stan Sclaroff, and Bryan A. Plummer. 2020. Mule: Multimodal universal language embedding.ArXiv, abs/1909.03493.
Diederik P. Kingma and Jimmy Ba. 2015. Adam: A method for stochastic optimization.CoRR, abs/1412.6980.
Xirong Li, Xiaoxu Wang, Chaoxi Xu, Weiyu Lan, Qijie Wei, Gang Yang, and Jieping Xu. 2018. COCO-CN for cross-lingual image tagging, captioning and retrieval.CoRR, abs/1805.08661.
Tsung-Yi Lin, Michael Maire, Serge J. Belongie, Lubomir D. Bourdev, Ross B. Girshick, James Hays, Pietro Perona, Deva Ramanan, Piotr Dollar, and C. Lawrence Zitnick. 2014. Microsoft COCO: common objects in context.CoRR, abs/1405.0312.
Alireza Mohammadshahi, Remi Lebret, and Karl Aberer. 2019. Aligning multilingual word embeddings for cross-modal retrieval task.ArXiv, abs/1910.03291.
Hideki Nakayama and Noriki Nishida. 2016. Zero-resource machine translation by multimodal encoder-decoder network with multimedia pivot. CoRR, abs/1611.04503.
Janarthanan Rajendran, Mitesh M. Khapra, Sarath Chandar, and Balaraman Ravindran. 2016. Bridge correlational neural networks for multilingual multimodal representation learning. In Proceedings of the 2016 Conference of the North American Chapter of the Association for Computational Linguistics: Human Language Technologies, pp. 171-181, San Diego, California. Association for Computational Linguistics.
Guy Rotman, Ivan Vulic, and Roi Reichart. 2018. Bridging languages through images with deep partial canonical correlation analysis. In Proceedings of the 56th Annual Meeting of the Association for Computational Linguistics (vol. 1: Long Papers), pp. 910-921, Melbourne, Australia. Association for Computational Linguistics.
Devashish Shankar, Sujay Narumanchi, HA Ananya, Pramod Kompalli, and Krishnendu Chaudhury. 2017. Deep learning based large scale visual recommendation and search for e-commerce.arXiv preprint arXiv:1703.02344.
Nitish Srivastava, Geoffrey Hinton, Alex Krizhevsky, Ilya Sutskever, and Ruslan Salakhutdinov. 2014. Dropout: A simple way to prevent neural networks from overfitting.J. Mach. Learn. Res., 15(1):1929-1958.
Ashish Vaswani, Noam Shazeer, Niki Parmar, Jakob Uszkoreit, Llion Jones, Aidan N. Gomez, Lukasz Kaiser, and Illia Polosukhin. 2017. Attention is all you need.CoRR, abs/1706.03762.
Jiahong Wu, He Zheng, Bo Zhao, Yixin Li, Baoming Yan, Rui Liang, Wenjia Wang, Shipei Zhou, Guosen Lin, Yanwei Fu, Yizhou Wang, and Yonggang Wang. 2017. AI challenger: A large-scale dataset for going deeper in image understanding.CoRR, abs/1711. 06475.
Fan Yang, Ajinkya Kale, Yury Bubnov, Leon Stein, Qiaosong Wang, Hadi Kiapour, and Robinson Piramuthu. 2017. Visual search at ebay. In Proceedings of the 23rd ACM SIGKDD International Conference on Knowledge Discovery and Data Mining, pp. 2101-2110.
Yinfei Yang, Daniel Cer, Amin Ahmad, Mandy Guo, Jax Law, Noah Constant, Gustavo Hernandez Abrego, Steve Yuan, Chris Tar, Yun-Hsuan Sung, Brian Strope, and Ray Kurzweil. 2019. Multilingual universal sentence encoder for semantic retrieval. CoRR, abs/1907.04307.
Yuya Yoshikawa, Yutaro Shigeto, and Akikazu Takeuchi. 2017. STAIR captions: Constructing a large-scale Japanese image caption dataset. In Proceedings of the 55th Annual Meeting of the Association for Computational Linguistics (vol. 2: Short Papers), pp. 417-421, Vancouver, Canada. Association for Computational Linguistics.
Yanhao Zhang, Pan Pan, Yun Zheng, Kang Zhao, Yingya Zhang, Xiaofeng Ren, and Rong Jin. 2018. Visual search at alibaba. In Proceedings of the 24th ACM SIGKDD International Conference on Knowledge Discovery & Data Mining, pp. 993-1001.

(56) References Cited

OTHER PUBLICATIONS

Portaz, Maxime et al.; "Image search using multilingual texts: a cross-modal learning approach between image and text"; May 14, 2019; Cornell University; https://arxiv.org/abs/1903.11299.
G. Huang, Z. Liu, L. Van Der Maaten and K. Q. Weinberger, "Densely Connected Convolutional Networks," 2017 IEEE Conference on Computer Vision and Pattern Recognition (CVPR), Honolulu, HI, 2017, pp. 2261-2269, doi: 10.1109/CVPR.2017.243.
Tensor Flow Hub; Text embedding: universal-sentence-encoder-multilingual-large; Date downloaded Nov. 16, 2020; https://tfhub.dev/google/universal-sentence-encoder-multilingual-large/3.
Lionbridge homepage; Date downloaded Nov. 16, 2020; https://www.lionbridge.com.

* cited by examiner

| Model | en | de | fr | it | es | ru | ja | zh | pl | tr | ko |
|---|---|---|---|---|---|---|---|---|---|---|---|
| $LASER_{PATR}$ | 0.803 | 0.702 | 0.686 | 0.673 | 0.682 | 0.677 | 0.572 | 0.672 | 0.666 | 0.597 | 0.518 |
| $USE_{PATR}$ | 0.836 | 0.712 | 0.756 | 0.769 | 0.761 | 0.734 | 0.643 | 0.736 | 0.718 | 0.669 | 0.694 |
| $LASER_{M3L}$ | 0.815 | 0.706 | 0.712 | 0.701 | 0.714 | 0.686 | 0.583 | 0.717 | 0.689 | 0.652 | 0.533 |
| $USE_{M3L}$ | 0.853 | 0.735 | 0.789 | 0.789 | 0.767 | 0.736 | 0.678 | 0.761 | 0.717 | 0.709 | 0.707 |

GENERATING EMBEDDINGS IN A MULTIMODAL EMBEDDING SPACE FOR CROSS-LINGUAL DIGITAL IMAGE RETRIEVAL

BACKGROUND

In recent years, computer-implemented technologies have improved software platforms for retrieving digital data relevant to search queries. For example, many conventional systems can implement models that retrieve digital images that are relevant to a search query based on characteristics (e.g., a description) of the digital image(s) and the contents of the search query. Some conventional systems utilize models that perform digital image retrieval in response to search queries submitted in various languages. Although conventional systems can provide such cross-lingual digital image retrieval, such systems are often rigidly require data in other languages to train their image-retrieval models and inaccurately retrieve digital images that are not relevant to the search queries.

SUMMARY

This disclosure describes one or more embodiments of methods, non-transitory computer-readable media, and systems that solve one or more of the foregoing problems and provide other benefits. For example, in one or more embodiments, the disclosed systems implement a zero-shot approach to learn multimodal representations of texts for retrieving digital images based on queries across languages. To illustrate, in some implementations, the disclosed systems train a cross-lingual image retrieval model on a monolingual training dataset but can utilize the cross-lingual image retrieval model in a zero-shot cross-lingual implementation during inference to retrieve digital images based on queries in different languages. In some instances, the disclosed systems train the cross-lingual image retrieval model using a multimodal metric loss function that tightens embedding clusters by pushing embeddings for dissimilar texts and digital images away from one another. Thus, the disclosed systems flexibly train a cross-lingual image retrieval model without reliance on input-text data from multiple languages. Further, the disclosed systems more accurately identify images that are relevant to a query for improved digital image retrieval.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures.

FIG. 7 illustrates a table reflecting quantitative testing results regarding the effectiveness of the cross-lingual image search system in accordance with one or more embodiments.

FIG. 8 illustrates graphical representations reflecting qualitative testing results regarding the effectiveness of the cross-lingual image search system in accordance with one or more embodiments.

DETAILED DESCRIPTION

Figure 1:
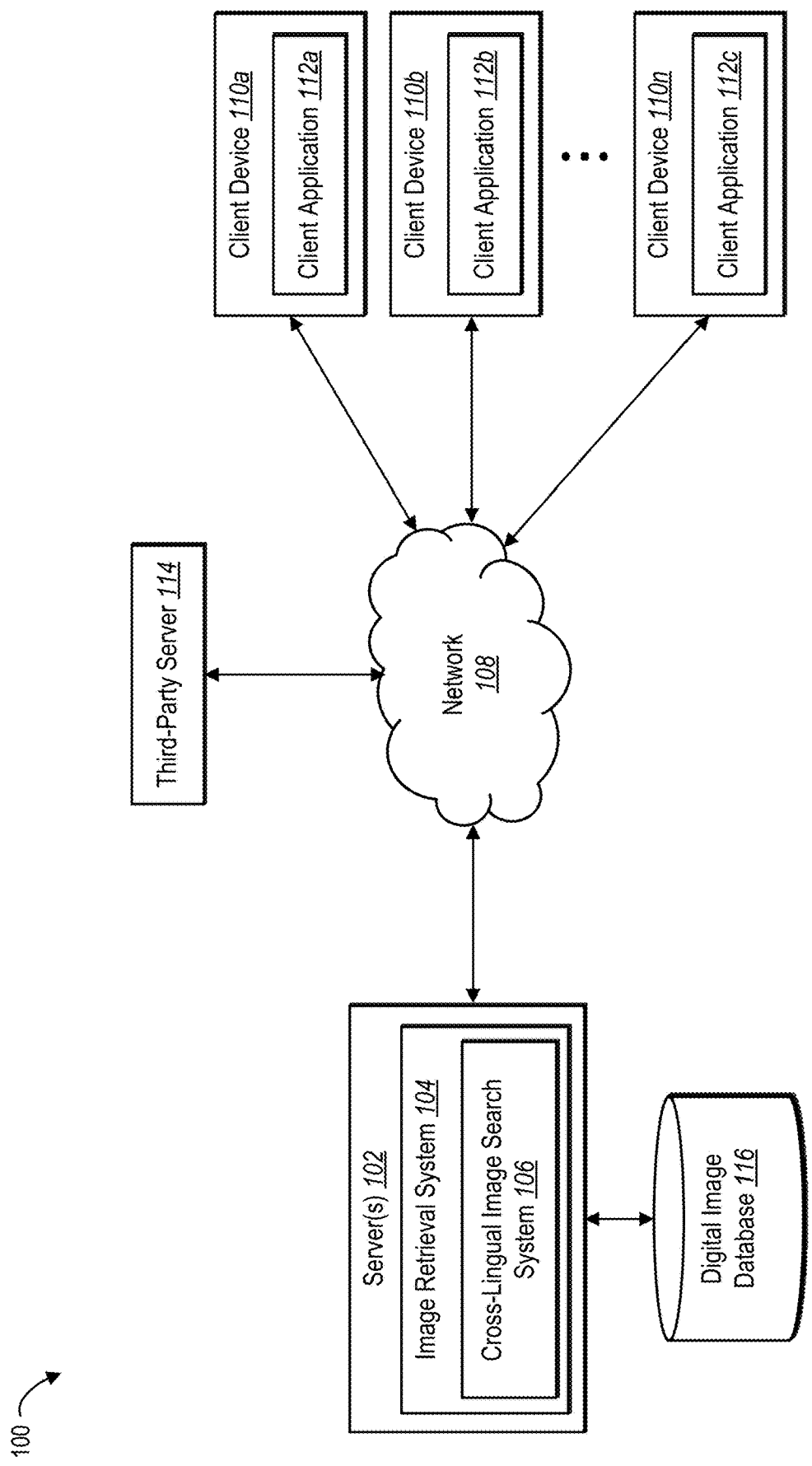
FIG. 1 illustrates an example system environment in which a cross-lingual image search system can operate in accordance with one or more embodiments.

The disclosure describes one or more embodiments of a cross-lingual image search system that utilizes a multimodal embedding space for image embeddings and cross-lingual-multimodal embeddings of multiple languages to identify digital images that correspond to (e.g., are relevant to) the text from search queries. For example, in one or more embodiments, the cross-lingual image search system utilizes a cross-lingual image retrieval model (e.g., composed of an image-embedding model and a cross-lingual-multimodal-embedding model) to generate embeddings for a query text and digital images within a common, multimodal embedding space. The cross-lingual image search system further identifies one or more digital images that correspond to the query text based on distances within the multimodal embedding space between the embeddings for the digital images and an embedding for the query text. In some instances, the cross-lingual image search system trains the cross-lingual image retrieval model using a multimodal metric loss function that reduces the distance between an embedding for a text and the embeddings for corresponding digital images and increases the distances between the embedding for the text and the embeddings for dissimilar texts and non-corresponding digital images. In some implementations, the cross-lingual image search system trains the cross-lingual image retrieval model using one sample language but can implement the cross-lingual image retrieval model to identify digital images that correspond to queries of various different languages.

To provide an illustration, in one or more embodiments, the cross-lingual image search system receives, from a client device, a query comprising text in a language from multiple languages. The cross-lingual image search system generates, within a multimodal embedding space for image embeddings and cross-lingual-multimodal embeddings of the multiple languages, a cross-lingual-multimodal embedding for the text from the query utilizing a cross-lingual-multimodal-embedding model. In some implementations, the crosslingual-multimodal-embedding model comprises parameters modified (i) to reduce embedding distances between cross-lingual-multimodal embeddings for image texts and positive-image embeddings for corresponding positive images and (ii) to increase embedding distances between the cross-lingual-multimodal embeddings and negative-image embeddings for non-corresponding negative images. The cross-lingual image search system further determines an image embedding for a digital image corresponding to the text from the query based on an embedding distance within the multimodal embedding space between the cross-lingual-multimodal embedding for the text and the image embedding. Accordingly, in response to the query, the cross-lingual image search system retrieves the digital image for display on the client device.

As indicated above, in one or more embodiments, the cross-lingual image search system generates cross-lingual-multimodal embeddings for texts from queries utilizing a cross-lingual-multimodal-embedding model having parameters modified to adjust embedding distances within a multimodal embedding space. Indeed, in one or more embodiments, the cross-lingual image search system trains a cross-lingual-multimodal-embedding model by learning parameters that facilitate identification of digital images that correspond to (e.g., are relevant to) texts from queries.

For example, in some implementations, the cross-lingual image search system learns the parameters for the cross-lingual-multimodal-embedding model by using sets of training data comprising a positive image, a positive text for the positive image in a sample language, a negative image, and a negative text for the negative image in the sample language. For each set of training data, the cross-lingual image search system utilizes an image-embedding model to generate, within a multimodal embedding space, a positive-image embedding for the positive image and a negative-image embedding for the negative image. Further, the cross-lingual image search system utilizes a cross-lingual-multimodal-embedding model to generate, within the multimodal embedding space, a positive cross-lingual-multimodal embedding for the positive text and a negative cross-lingual-multimodal embedding for the negative text. In some instances, the cross-lingual-multimodal-embedding model utilizes a cross-lingual-text encoder to generate text embeddings—such as sentence-level embeddings—for the positive text and the negative text and further utilizes one or more neural network layers to generate the positive cross-lingual-multimodal embedding and the negative cross-lingual-multimodal embedding based on the text embeddings.

In one or more embodiments, the cross-lingual image search system determines embedding distances between the embeddings corresponding to each set of training data and modifies the parameters of the cross-lingual-multimodal-embedding model based on these embedding distances. In one or more embodiments, the cross-lingual image search system modifies the parameters of the cross-lingual-multimodal-embedding model by modifying one or more parameters of the one or more neural network layers while maintaining the parameters of the cross-lingual-text encoder. In some implementations, the cross-lingual image search system modifies the parameters based on a multimodal metric loss determined using a multimodal metric loss function.

In some cases, the cross-lingual image search system trains the cross-lingual-multimodal-embedding model using a single sample language. In other words, the cross-lingual image search system utilizes sets of training data having positive texts and negative texts in the same language.

Despite using a single sample language in a zero-shot approach to training, in some embodiments, the cross-lingual image search system can retrieve images in response to queries in multiple languages.

As further mentioned above, in one or more embodiments, the cross-lingual image search system generates cross-lingual-multimodal embeddings for texts from queries received from client devices. As an example, the cross-lingual image search system utilizes the cross-lingual-multimodal-embedding model comprising learned parameters to generate a cross-lingual-multimodal embedding for the text from a query within the multimodal embedding space. In some implementations, the cross-lingual image search system utilizes the cross-lingual-multimodal-embedding model to generate cross-lingual-multimodal embeddings for texts of multiple languages, despite training the cross-lingual-multimodal-embedding model using a single sample language.

The cross-lingual image search system further utilizes the image-embedding model to generate image embeddings for digital images within the multimodal embedding space. In one or more embodiments, the cross-lingual image search system generates and stores the image embeddings for the digital images prior to receiving any queries. As an example, the cross-lingual image search system maintains, within storage, a plurality of image embeddings corresponding to digital images for access when a query is received for digital image retrieval.

Indeed, as mentioned above, in one or more embodiments, the cross-lingual image search system determines one or more digital images that correspond to (e.g., are relevant to) the text from a query. In particular, the cross-lingual image search system identifies the one or more digital images based on an embedding distance within the multimodal embedding space between their corresponding image embeddings and the cross-lingual-multimodal embedding for the text from the query. To provide an example, in some instances, the cross-lingual image search system determines one or more image embeddings that are close in proximity to the cross-lingual-multimodal embedding, such as a number of image embeddings that are closest to the cross-lingual-multimodal embedding. Accordingly, the cross-lingual image search system retrieves the digital images corresponding to the one or more image embeddings for display on the client device (e.g., the client device that submitted the query).

As mentioned above, conventional image retrieval systems suffer from several technological shortcomings that result in inflexible and inaccurate operation. For example, conventional image retrieval systems utilize various approaches for providing multi-lingual digital image retrieval features—such as minimizing the distance between image and caption pairs as well as multi-lingual pairs of text within a common embedding space; using images as pivots to perform metric learning, potentially with the aid of visual object detection and multi-head attention; or using language-independent text encoders to align different languages to a common embedding space using shared weights. Such conventional systems, however, are inflexible in that they use models that typically require at least some data from other languages to learn to retrieve corresponding digital images. In particular, many of these conventional systems are rigidly dependent upon the availability of multi-lingual datasets, such as large parallel language corpora, to train the implemented models for satisfactory operation.

Additionally, conventional image retrieval systems often operate inaccurately. As mentioned, many conventional systems require the use of multi-lingual datasets for training models to perform digital image retrieval for multiple languages; however, there is a lack of these datasets that are adequate (e.g., sufficiently comprehensive) for such a task. Accordingly, such conventional systems often fail to accurately retrieve digital images that correspond to the text of a query. Some conventional systems attempt to overcome these issues by generating multi-lingual image datasets; however, these datasets generally focus on word-level concepts, losing out on inter-concept and inter-object contexts that are often present in digital images presenting complex visuals, such as real-world scenes. Accordingly, such systems often fail to accurately determine the intent and context of text queries, leading to the retrieval of irrelevant digital images.

In some instances, conventional image retrieval systems generate embeddings for texts of multiple languages and embeddings for digital images within a common embedding space. For example, conventional image retrieval systems may utilize models that generate embeddings for texts and digital images and then normalize the embeddings to fit within a common embedding space. However, as suggested, these systems often configure a new embedding space within which to project the embeddings, leading to computational inefficiencies via the demand of unnecessary computing resources. Further, such conventional systems often train their implemented models using a triplet that includes one training digital image, a text that matches (e.g., describes) the digital image, and a text that does not match. The conventional systems typically use a triplet loss to ensure that the embedding for the matching text is closer to the embedding for the digital image than the embedding for the text that does not match. Use of such a loss, however, is often insufficient to accurately capture the similarities and dissimilarities between texts and digital images.

The cross-lingual image search system provides several advantages over conventional systems. For example, the cross-lingual image search system operates more flexibly than conventional systems. Indeed, as mentioned above, in some implementations, the cross-lingual image search system trains a cross-lingual-multimodal-embedding model to generate cross-lingual-multimodal embeddings using a single sample language but flexibly utilizes the cross-lingual-multimodal-embedding model to generate cross-lingual-multimodal embeddings for texts of multiple languages. Accordingly, the cross-lingual image search system flexibly operates without the use of data from multiple languages (e.g., multi-lingual datasets) that is required by many conventional systems.

Additionally, the cross-lingual image search system operates more accurately than conventional systems. Indeed, by training a cross-lingual-multimodal-embedding model without using data from multiple languages, the cross-lingual image search system avoids the inaccuracies in digital image retrieval caused by a lack of available multi-lingual data. Further, by generating cross-lingual-multimodal embeddings for texts from queries based on text embeddings—such as sentence-level embeddings—for the texts, the cross-lingual image search system more accurately captures intent and context of the text, allowing for retrieval of digital images that are relevant to the corresponding queries.

Further, the cross-lingual image search system improves upon conventional systems by utilizing a multimodal embedding space that corresponds to the output of an image-embedding model. Indeed, in some embodiments, the cross-lingual image search system generates image embeddings and cross-lingual-multimodal embeddings to include a set of dimensions that corresponds an output of the image-embedding model. In other words, the cross-lingual image search system projects the embeddings corresponding to texts into the same embedding space as the image embeddings. Indeed, as suggested above, in some implementations, the cross-lingual image search system utilizes a cross-lingual text encoder to generate text embeddings within one embedding space and further utilizes one or more neural network layers to transform the text embeddings into cross-lingual-multimodal embeddings within a multimodal embedding space. Thus, the cross-lingual image search system avoids the computational inefficiencies associated with projecting both types of embeddings into a new embedding space.

Additionally, the cross-lingual image search system more accurately captures the similarities and dissimilarities between texts and digital images by using the positive image, positive text, negative image, and negative text during training. Indeed, in some instances, by utilizing a multimodal metric loss function, the cross-lingual image search system better minimizes the distance between an image embedding and a corresponding cross-lingual-multimodal embedding and maximizes the distance between the image embedding and a non-corresponding cross-lingual-multimodal embedding. Further, by utilizing a negative image as well as a positive image, the cross-lingual image search system minimizes the distance between a cross-lingual-multimodal embedding and a corresponding image embedding and maximizes the distance between the cross-lingual-multimodal embedding and a non-corresponding image embedding. In other words, the cross-lingual image search system brings cross-lingual-multimodal embeddings and corresponding image embeddings closer together within the multimodal embedding space while pushing non-corresponding cross-lingual-multimodal embeddings and non-corresponding image embeddings farther away.

Additional detail regarding the cross-lingual image search system will now be provided with reference to the figures. For example, FIG. 1 illustrates a schematic diagram of an exemplary system 100 in which a cross-lingual image search system 106 can be implemented. As illustrated in FIG. 1, the system 100 includes a server(s) 102, a network 108, client devices 110a-110n, a third-party server 114, and a digital image database 116.

Although the system 100 of FIG. 1 is depicted as having a particular number of components, the system 100 can have any number of additional or alternative components (e.g., any number of servers, client devices, third-party servers, digital image databases 116, or other components in communication with the cross-lingual image search system 106 via the network 108). Similarly, although FIG. 1 illustrates a particular arrangement of the server(s) 102, the network 108, the client devices 110a-110n, the third-party server 114, and the digital image database 116, various additional arrangements are possible.

The server(s) 102, the network, 108, the client devices 110a-110n, the third-party server 114, and the digital image database 116 may be communicatively coupled with each other either directly or indirectly (e.g., through the network 108 discussed in greater detail below in relation to FIG. 11). Moreover, the server(s) 102, the client devices 110a-110n, and the third-party server 114 may include a variety of computing devices (including one or more computing devices as discussed in greater detail with relation to FIG. 11).

As mentioned above, the system 100 includes the server(s) 102. In one or more embodiments, the server(s)

102 generate, store, receive, and/or transmit digital data, including digital data related digital images and queries for digital image retrieval. To provide an example, in some instances, the server(s) 102 receive a query from a client device (e.g., one of the client devices 110a-110n) and transmit a corresponding digital image to the client device in response. In one or more embodiments, the server(s) 102 comprise a data server. In some embodiments, the server(s) 102 comprise a communication server or a web-hosting server.

As shown in FIG. 1, the server(s) 102 include the image retrieval system 104. In one or more embodiments, the image retrieval system 104 provides functionality for retrieving digital images. For example, in some implementations, the image retrieval system 104 retrieves digital images in response to a request. In particular, the image retrieval system 104 analyzes the request to determine what digital image or what kind of digital image the request is meant to acquire. Accordingly, the image retrieval system 104 identifies one or more digital images (e.g., from the digital image database 116) that correspond to the request based on the analysis of the request.

Additionally, the server(s) 102 include the cross-lingual image search system 106. In particular, in one or more embodiments, the cross-lingual image search system 106 utilizes the server(s) 102 to retrieve digital images that correspond to texts in multiple languages. For example, in some instances, the cross-lingual image search system 106 utilizes the server(s) 102 to receive a query comprising a text in one of multiple languages and retrieving a digital image that corresponds to the text in response to receiving the query.

To illustrate, in one or more embodiments, the cross-lingual image search system 106, via the server(s) 102, receives, from a client device, a query having text in a particular language. The cross-lingual image search system 106, via the server(s) 102, further utilizes a cross-lingual-multimodal-embedding model having learned parameters to generate a cross-lingual-multimodal embedding for the text from the query within a multimodal embedding space for image embeddings and cross-lingual-multimodal embeddings of multiple languages, including the language corresponding to the text from the query. Via the server(s) 102, the cross-lingual image search system 106 determines (e.g., identifies) an image embedding for a digital image that corresponds to the text from the query based on an embedding distance within the multimodal embedding space between the cross-lingual-multimodal embedding for the text and the image embedding. Accordingly, the cross-lingual image search system 106, via the server(s) 102, retrieves the digital image for display on the client device in response to the query.

In one or more embodiments, the third-party server 114 receives or manages digital images or facilitates the submission of queries for digital image retrieval. For example, in some instances, the third-party server 114 includes a search engine platform that generates queries. To provide an example, a client device accesses the third-party server 114 and enters text (e.g., via a user interface). In response, the third-party server 114 generates a query based on the entered text and submits the query to the cross-lingual image search system 106 (e.g., via the network 108). In some implementations, the third-party server 114 obtains digital images (e.g., from client devices or from websites, such as social media pages where retrieval of digital images have been allowed) and provides the digital images for storage within the digital image database 116.

In one or more embodiments, the digital image database 116 stores digital images for retrieval in response to queries. As an example, in some embodiments, the digital image database 116 store digital images provided by the cross-lingual image search system 106 and/or the third-party server 114. The digital image database 116 further provides access to the stored digital images to the cross-lingual image search system 106. Though FIG. 1 illustrates the digital image database 116 as a distinct component, one or more embodiments include the digital image database 116 as a component of the server(s) 102, the image retrieval system 104, or the cross-lingual image search system 106.

In one or more embodiments, the client devices 110a-110n include computing devices that are capable of submitting queries and receiving digital images. For example, in some implementations, the client devices 110a-110n include at least one of a smartphone, a tablet, a desktop computer, a laptop computer, a head-mounted-display device, or other electronic devices. In some instances, the client devices 110a-110n include one or more applications (e.g., client applications 112a-112n, respectively) that are capable of submitting queries and receiving digital images. For example, in some embodiments, the client applications 112a-112n each include a software application respectively installed on the client devices 110a-110n. In other cases, however, the client applications 112a-112n each include a web browser or other application that accesses a software application hosted on the server(s) 102.

The cross-lingual image search system 106 can be implemented in whole, or in part, by the individual elements of the system 100. Indeed, although FIG. 1 illustrates the cross-lingual image search system 106 implemented with regard to the server(s) 102, different components of the cross-lingual image search system 106 can be implemented by a variety of devices within the system 100. For example, one or more (or all) components of the cross-lingual image search system 106 can be implemented by a different computing device (e.g., one of the client devices 110a-110n) or a separate server from the server(s) 102 hosting the image retrieval system 104 (e.g., the third-party server 114). Example components of the cross-lingual image search system 106 will be described below with regard to FIG. 9.

Figure 2:
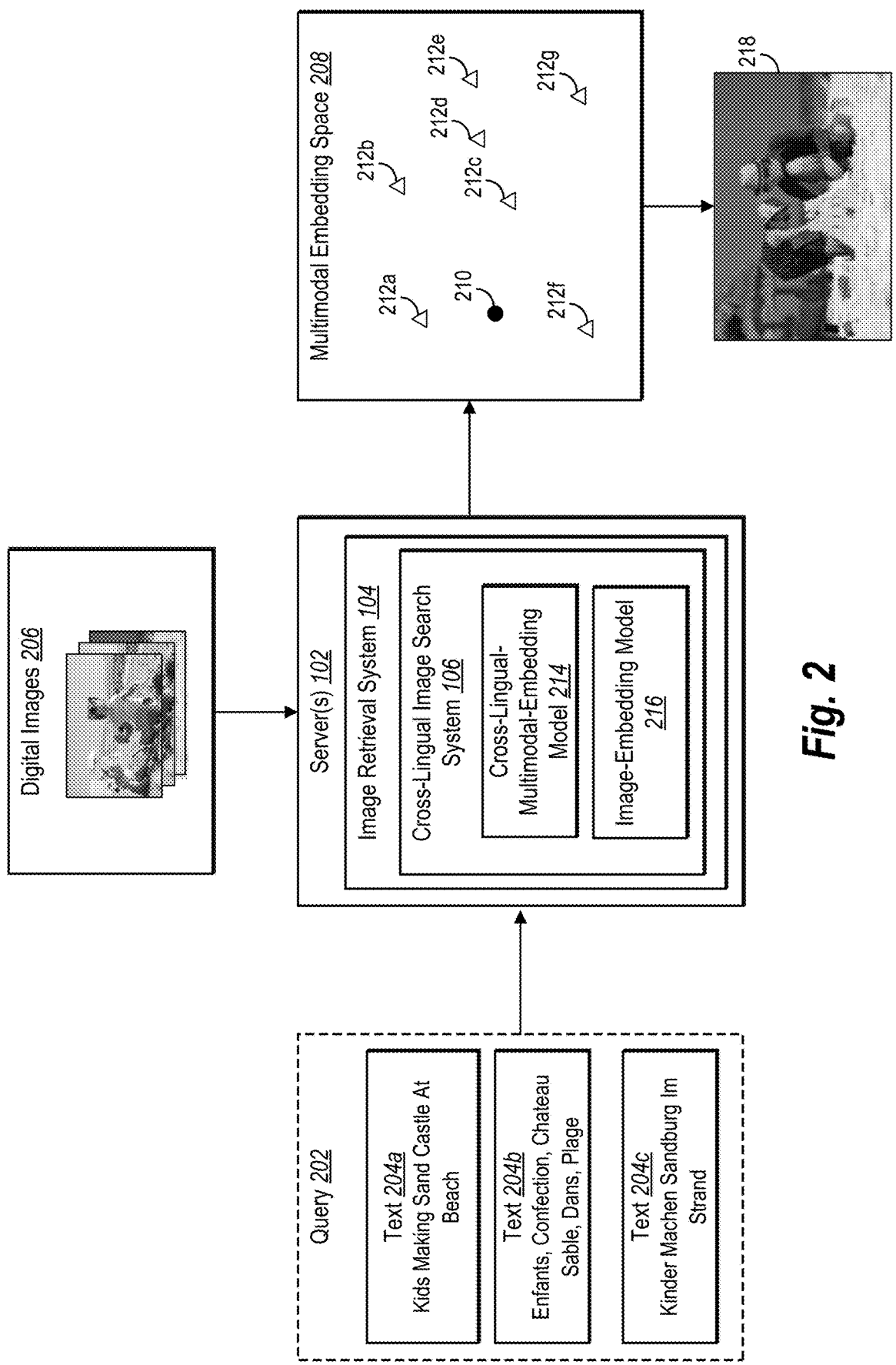
FIG. 2 illustrates an overview diagram of the cross-lingual image search system retrieving a digital image in response to receiving a query in accordance with one or more embodiments.

As mentioned above, in one or more embodiments, the cross-lingual image search system 106 retrieves digital images in response to receiving queries having texts in multiple languages. FIG. 2 illustrates an overview diagram of the cross-lingual image search system 106 retrieving a digital image in response to receiving a query in accordance with one or more embodiments.

As shown in FIG. 2, the cross-lingual image search system 106 receives a query 202. In one or more embodiments, a query (also referred to as a text query) includes a request for digital data. Indeed, in some implementations, a query includes a request to retrieve, transmit, display, download, or otherwise access digital data, such as digital data that has been stored within a database or some other form of data storage. To illustrate, in some cases, a query includes a request to retrieve, transmit, display, download, or otherwise access a digital image.

In one or more embodiments, the cross-lingual image search system 106 receives the query 202 from a client device. Indeed, in some embodiments, the cross-lingual image search system 106 receives the query 202 directly from a client device over a network. In some instances, however, the cross-lingual image search system 106 receives the query 202 via a third party, such as a third-party server that hosts a platform for accepting queries (e.g., a search engine).

As illustrated in FIG. 2, the query 202 includes text, such as one of the texts 204a-204c. In one or more embodiments, a text includes a textual representation of a request. In some instances, a text includes an image text associated with a digital image to be retrieved, transmitted, displayed, downloaded, or otherwise accessed (e.g., a caption or metadata associated with the digital image). In some cases, a text more particularly includes an image description of a digital image (e.g., a written description—such as multiple sentences, a single sentence, or part of a sentence—that describes features, objects, scenery, or other characteristics of a digital image). In some implementations, a text includes one or more keywords (e.g., a list of required or alternative keywords) represented in a digital image to be retrieved, transmitted, displayed, downloaded, or otherwise accessed. In some embodiments, the query 202 includes data in addition to the text. For example, in some cases, the query 202 includes one or more filters to be applied or constraints to be met when identifying digital images in response to the query 202.

As further shown in FIG. 2, the text from the query 202 includes text in a particular language. Indeed, in some implementations, the query 202 includes text in one of multiple languages. In one or more embodiments, a language includes a system of structured communication using words, symbols, or signs. In particular, a language includes a system of human communication that is written, spoken, and/or communicated through movement (e.g., sign language). For example, a language includes one of the systems of structured communication utilized by various peoples throughout the world. To illustrate, FIG. 2 shows the text 204a in English, the text 204b in French, and the text 204c in German. It should be understood, however, that the cross-lingual image search system 106 is not limited to text in these languages alone. For example, in some instances, the cross-lingual image search system 106 retrieves digital images in response to queries submitted in over ninety languages (e.g., one hundred languages).

Additionally, as shown in FIG. 2, the cross-lingual image search system 106 identifies digital images 206. In one or more embodiments, a digital image includes a visualization of digital data. In some embodiments, a digital image includes a digital item capable of providing a visual representation. For example, in some cases, a digital image includes a digital photograph or digital recreation of a photograph, a digital sketch or drawing, or a digital representation of a graphic design. In some instances, a digital image includes a video frame of a previously-captured digital video or a video frame of a digital video feed.

In one or more embodiments, the cross-lingual image search system 106 identifies the digital images 206 by receiving the digital images 206 (e.g., from one or more client devices or third-party servers). In some instances, the cross-lingual image search system 106 identifies the digital images 206 by accessing a database storing the digital images 206. For example, in some implementations, the cross-lingual image search system 106 maintains a database that stores digital images for subsequent access. In some cases, the cross-lingual image search system 106 actively retrieves the digital images 206 from another platform (e.g., a third-party server) where access to digital images is allowed.

As further shown in FIG. 2, the cross-lingual image search system 106 generates, within a multimodal embedding space 208, a cross-lingual-multimodal embedding 210, and image embeddings 212a-212g. In particular, the cross-lingual image search system 106 generates the cross-lingual-multimodal embedding 210 based on the text (e.g., one of the texts 204a-204c) from the query 202 and generates the image embeddings 212a-212g based on the digital images 206.

Generally, in one or more embodiments, an embedding space includes a space in which digital data is embedded. In particular, in some embodiments, an embedding space includes a space (e.g., a mathematical or numerical space) in which some representation of digital data (referred to as an embedding) exists. For example, in some implementations, an embedding space includes a dimensionality associated with a representation of digital data, including the number of dimensions associated with the representation and/or the types of dimensions. In one or more embodiments, a multimodal embedding space includes an embedding space for image embeddings and cross-lingual-multimodal embeddings of multiple languages (e.g., representing digital data associated with multiple languages).

In one or more embodiments, a dimension includes an attribute of digital data. For example, in some embodiments, a dimension includes an attribute of an embedding within an embedding space. In some implementations, a dimension includes an attribute of an image embedding or an attribute of a cross-lingual-multimodal embedding within a multimodal embedding space. In some instances, a dimension includes an attribute of a text embedding within a cross-lingual embedding space (text embeddings and cross-lingual embedding spaces will be discussed in more detail below).

In one or more embodiments, a cross-lingual-multimodal embedding includes a numerical or vector representation of text within a multimodal embedding space. In particular, in some embodiments, a cross-lingual-multimodal embedding includes a numerical or vector representation, within a multimodal embedding space, of a text (e.g., of features or characteristics of the text) in a particular language. For example, in some implementations, a cross-lingual-multimodal embedding, includes a numerical or vector representation generated based on an analysis of the corresponding text and/or an analysis of another embedding generated from the corresponding text. In some implementations, a cross-lingual-multimodal embedding for a text in one language differs from a cross-lingual-multimodal embedding for a text in a different language, even where the texts represent similar subject matter. As an example, in some embodiments, the cross-lingual image search system 106 generates a cross-lingual-multimodal embedding for a first text in a first language that differs from a cross-lingual-multimodal embedding for a second text in a second language even where the first text corresponds to a translation of the second text into the first language.

In one or more embodiments, an image embedding includes a numerical or vector representation of a digital image. In particular, in some embodiments, an image embedding includes a numerical or vector representation of a digital image within a multimodal embedding space. For example, in some implementations, an image embedding includes a numerical or vector representation generated based on an analysis of the corresponding digital image.

In one or more embodiments, the cross-lingual image search system 106 utilizes a cross-lingual-multimodal-embedding model 214 to generate the cross-lingual-multimodal embedding 210 within the multimodal embedding space 208 based on the text from the query 202. In some embodiments, a cross-lingual-multimodal-embedding model includes a computer algorithm or model that generates cross-lingual-multimodal embeddings for texts. In particular, in some embodiments, a cross-lingual-multimodal-embedding model includes a computer algorithm that determines the relationship between a text in a language and a multimodal embedding space and uses that relationship to generate a corresponding cross-lingual-multimodal embedding within the multimodal embedding space. More detail regarding the cross-lingual-multimodal-embedding model 214 will be provided below.

Further, in one or more embodiments, the cross-lingual image search system 106 utilizes an image-embedding model 216 to generate the image embeddings 212a-212g within the multimodal embedding space 208 based on the digital images 206. In one or more embodiments, an image-embedding model includes a computer algorithm or model that generates image embeddings for digital images. In particular, in some embodiments, an image-embedding model includes a computer algorithm that determines a relationship between a digital image and a multimodal embedding space and uses that relationship to generate a corresponding image embedding. More detail regarding the image-embedding model 216 will be provided below.

In one or more embodiments, the cross-lingual image search system 106 generates the image embeddings 212a-212g before receiving the query 202. For example, in at least one implementation, the cross-lingual image search system 106 receives or otherwise accesses the digital images 206, generates the image embeddings 212a-212g within the multimodal embedding space 208, and stores the image embeddings 212a-212g before receiving any queries. Accordingly, the cross-lingual image search system 106 accesses the image embeddings 212a-212g within storage in response to receiving a query and utilizes the image embeddings 212a-212g to identify a digital image that corresponds to text from the query.

Indeed, in one or more embodiments, the cross-lingual image search system 106 utilizes the cross-lingual-multimodal embedding 210 for the text from the query 202 and the image embeddings 212a-212g for the digital images 206 to retrieve a digital image 218 in response to the query 202. For example, in some embodiments, the cross-lingual image search system 106 determines that the digital image 218 corresponds to the query 202 (e.g., corresponds to the text from the query 202) based on embedding distances between the cross-lingual-multimodal embedding 210 and the image embeddings 212a-212g within the multimodal embedding space 208.

In one or more implementations, an embedding distance refers to a distance between embeddings within an embedding space. In particular, in some embodiments, an embedding distance refers to a measure of difference or dissimilarity (or likeness or similarity) between a pair of embeddings as represented by the distance between those embeddings within an embedding space. For example, as indicated above, an embedding distance can include a distance between a cross-lingual-multimodal embedding and an image embedding within a multimodal embedding space. In some embodiments, an embedding distance refers to a distance between two cross-lingual-multimodal embeddings or a distance between two image embeddings within a multimodal embedding space. As a further example, in some instances, an embedding distance refers to a square distance between two embeddings (which may be referred to as x and y) within a multimodal embedding space.

Indeed, in some implementations, the cross-lingual image search system 106 determines that the digital image 218 corresponds to the query 202 by determining that an image embedding for the digital image 218 corresponds to the query 202. In some implementations, the cross-lingual image search system 106 determines that an image embedding corresponds to the query 202 based on an embedding distance within the multimodal embedding space 208 between the image embedding and the cross-lingual-multimodal embedding 210 for the text from the query 202. For example, in some cases, the cross-lingual image search system 106 compares the embedding distance between the image embedding and the cross-lingual-multimodal embedding 210 to the embedding distances between the other image embeddings and the cross-lingual-multimodal embedding 210. Accordingly, the cross-lingual image search system 106 determines that the image embedding corresponds to the query 202 (or, at least, best corresponds to the query 202 relative to the other image embeddings) based on this comparison. More detail will be provided below regarding how the cross-lingual image search system 106 uses embedding distances to determine which image embeddings correspond to texts from queries.

In some implementations, upon determining that the image embedding for the digital image 218 corresponds to the query 202 (or, at least best corresponds to the query 202 relative to the other image embeddings), the cross-lingual image search system 106 retrieves the digital image 218. In some implementations, the cross-lingual image search system 106 provides the digital image 218 for display on a client device, such as the client device that submitted the query 202. For example, the cross-lingual image search system 106 provides the digital image 218 directly to the client device or to the client device through a third-party server.

Figure 3:
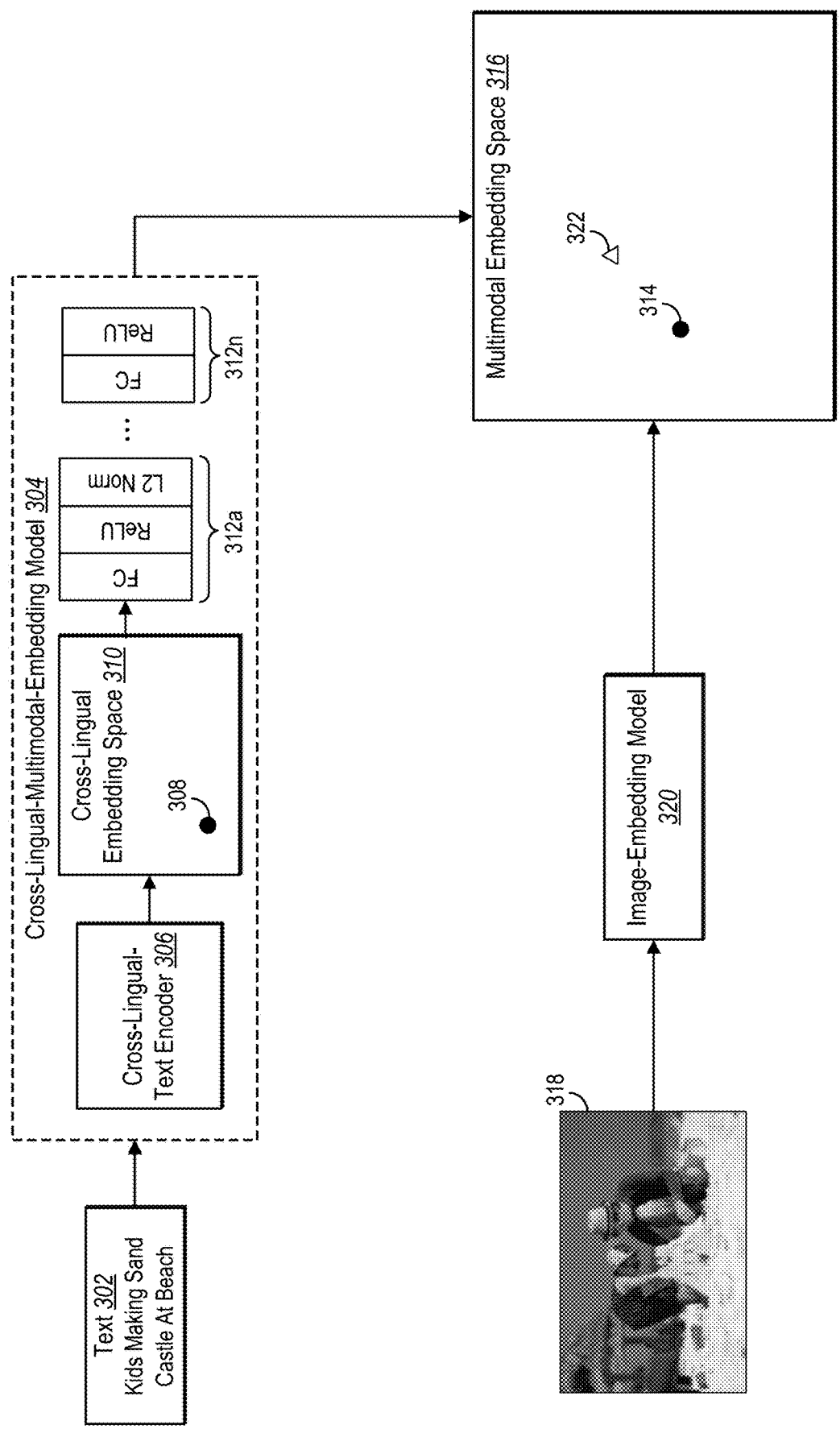
FIG. 3 illustrates a diagram for generating a cross-lingual-multimodal embedding and an image embedding in accordance with one or more embodiments.

As mentioned above, the cross-lingual image search system 106 generates cross-lingual-multimodal embeddings and image embeddings within a multimodal embedding space. In particular, the cross-lingual image search system 106 utilizes a cross-lingual-multimodal-embedding model to generate cross-lingual-multimodal embeddings and utilizes an image embedding model to generate image embeddings. FIG. 3 illustrates a diagram for generating a cross-lingual-multimodal embedding and an image embedding in accordance with one or more embodiments.

As shown in FIG. 3, the cross-lingual image search system 106 provides a text 302 to a cross-lingual-multimodal-embedding model 304. For example, the cross-lingual image search system 106 provides the text 302 after receiving a query that includes the text 302. Though FIG. 3 shows the text 302 in a particular language, the text 302 is in one of various other languages in some embodiments.

Further, as shown in FIG. 3, the cross-lingual image search system 106 utilizes a cross-lingual-text encoder 306 of the cross-lingual-multimodal-embedding model 304 to generate a text embedding 308 for the text 302 within a cross-lingual embedding space 310. In one or more embodiments, a cross-lingual embedding space includes an embedding space for text embeddings of multiple languages (e.g., representing texts associated with multiple languages). In some embodiments, a cross-lingual embedding space differs from a multimodal embedding space. For example, in some implementations, a cross-lingual embedding space differs in dimensionality from a multimodal embedding space (e.g., includes a different number of dimensions and/or different types of dimensions associated with a representation of digital data). To illustrate, in at least one example, a cross-lingual embedding space includes fewer dimensions than a multimodal embedding space.

In one or more embodiments, a text embedding includes a numerical or vector representation of text within a cross-lingual embedding space. In particular, in some embodiments, a text embedding includes a numerical or vector representation, within a cross-lingual embedding space, of a text (e.g., of features or characteristics of the text) in a particular language. For example, in some implementations, a text embedding, includes a numerical or vector representation generated based on an analysis of the corresponding text. In some implementations, a text embedding for a text in one language differs from a text embedding for a text in a different language, even where the texts represent similar subject matter. As an example, in some embodiments, the cross-lingual image search system 106 generates a text embedding for a first text in a first language that differs from a text embedding for a second text in a second language even where the first text corresponds to a translation of the second text into the first language.

Further, in one or more embodiments, a text embedding includes a sentence-level embedding for the corresponding text. In some embodiments, however, the text embedding includes a word-level or paragraph-level embedding for the corresponding text. By using text embeddings that are sentence-level (or paragraph-level) embeddings, in some embodiments, the cross-lingual image search system 106 more accurately captures the context and intent of the texts it analyzes, leading to more accurate digital image retrieval than possible under many conventional systems.

In one or more embodiments, a cross-lingual-text encoder includes a computer algorithm or model that generates text embeddings for texts. In particular, in some embodiments, a cross-lingual-text encoder includes a computer algorithm that determines the relationship between a text in a language and a cross-lingual embedding space and uses that relationship to generate a corresponding text embedding within the cross-lingual embedding space.

In one or more embodiments, the cross-lingual-text encoder 306 includes a language agnostic BiLSTM encoder to generate the text embedding 308. For example, in some embodiments, the cross-lingual-text encoder 306 includes an encoder described by Mikel Artetxe and Holger Schwenk, *Massively Multilingual Sentence Embeddings for Zero-shot Cross-lingual Transfer and Beyond*, CoRR, abs/1812.10464 (2018) (hereinafter, "Artetxe and Schwenk"), which is incorporated herein by reference in its entirety. In some instances, the cross-lingual-text encoder 306 includes a transformer-based encoder. Indeed, in some cases, the cross-lingual-text encoder 306 includes an encoder described by Yinfei Yang et al., *Multilingual Universal Sentence Encoder for Semantic Retrieval*, CoRR, abs/1907.04307 (2019) (hereinafter, "Yang") or Muthuraman Chidambaram et al., *Learning Cross-lingual Sentence Representations via a Multi-task Dual-encoder Model*, CoRR, abs/1810.12836 (2018), which are both incorporated herein by reference in their entirety.

As further shown in FIG. 3, the cross-lingual image search system 106 utilizes one or more neural network layers of the cross-lingual-multimodal-embedding model 304 to transform the text embedding 308 into a cross-lingual-multimodal embedding 314 for the text 302 within a multimodal embedding space 316. To provide some context, in one or more embodiments, a neural network includes a machine learning model that includes a model of interconnected artificial neurons that communicate and learn to approximate complex functions and generate outputs based on a plurality of inputs provided to the model. In some implementations, a neural network comprises an algorithm (or set of algorithms) that implements deep learning techniques that utilize a set of algorithms to model high-level abstractions in data. In one or more embodiments, a neural network layer includes a unit of interconnected artificial neurons. For example, a neural network layer includes a group of interconnected artificial neurons that analyzes an input to the neural network layer and generates an output.

In particular, as shown in FIG. 3, the cross-lingual image search system 106 utilizes sets of neural network layers 312a-312n of the cross-lingual-multimodal-embedding model 304 to transform the text embedding 308 into the cross-lingual-multimodal embedding 314 (e.g., to generate the cross-lingual-multimodal embedding 314 based on the text embedding 308). For example, as illustrated in the figure, the set of neural network layers 312a includes a fully connected ("FC") layer with dropout, a rectified linear units ("ReLU") activation layer, and a L2-norm ("L2 Norm") layer. As further shown, the set of neural network layers 312n includes a FC layer and a ReLU layer but does not include a L2 Norm layer. Indeed, in some implementations, the cross-lingual-multimodal-embedding model 304 does not utilize a L2 Norm layer in the final set of neural network layers to generate the cross-lingual-multimodal embedding 314 having a number of dimensions desired for the multimodal embedding space 316. In some cases, the cross-lingual-multimodal-embedding model includes three blocks comprising two blocks of an FC layer, a ReLU layer, and an L2 Norm layer and one block of an FC layer and a ReLU layer.

It should be understood that, though FIG. 3 shows the cross-lingual-multimodal-embedding model 304 including the sets of neural network layers 312a-312n, the cross-lingual-multimodal-embedding model 304 can include various numbers of sets of neural network layers, including one set of neural network layers, in some embodiments. Further, FIG. 3 illustrates the sets of neural network layers 312a-312n including a particular number of neural network layers, particular neural network layer types, and a particular order of neural network layers; however, the cross-lingual-multimodal-embedding model 304 can include sets of neural network layers having various numbers of neural network layers, various neural network layer types, and various orders of neural network layers in different embodiments.

Additionally, as shown in FIG. 3, the cross-lingual image search system 106 provides a digital image 318 to an image-embedding model 320. For example, as discussed above, in some instances, the cross-lingual image search system 106 provides the digital image 318 to the image-embedding model 320 before receiving any queries for image retrieval, such as the query that includes the text 302. Further, as shown, the cross-lingual image search system 106 utilizes the image-embedding model 320 to generate an image embedding 322 for the digital image 318 within the multimodal embedding space 316.

In one or more embodiments, the image-embedding model 320 includes an image-embedding model, such as the ResNet model described by Kaiming He et al., *Deep Residual Learning for Image Recognition*, CoRR, abs/1512.03385 (2015), which is incorporated herein by reference in its entirety. In some embodiments, the image-embedding model 320 includes an image-embedding model, such as a DenseNet model described by Gao Huang et al., *Densely Connected Convolutional Networks*, 2018, https://arxiv.org/abs/1608.06993, which is incorporated herein by reference in its entirety. In some implementations, the cross-lingual image search system 106 trains the image-embedding model on a database of digital images, such as the ImageNet database described by J. Deng et al., *Imagenet: A*

*Large-scale Hierarchical Image Database*, IEEE Conference on Computer Vision and Pattern Recognition, pp. 248-55 (2009), which is incorporated herein by reference in its entirety.

In one or more embodiments, the multimodal embedding space 316 corresponds to an embedding space utilized by the image-embedding model 320 to generate image embeddings. In particular, the multimodal embedding space 316 corresponds to a set of dimensions that also corresponds to an output of the image-embedding model 320. In contrast, as mentioned above, in some implementations, the cross-lingual embedding space 310 differs in dimensionality from the multimodal embedding space 316. In other words, the cross-lingual embedding space 310 corresponds to a set of dimensions that does not correspond to the output of the image-embedding model 320. Accordingly, the cross-lingual image search system 106 utilizes one or more neural network layers (e.g., the sets of neural network layers 312a-312n) of the cross-lingual-multimodal-embedding model 304 to transform text embeddings within the cross-lingual embedding space 310 (e.g., the text embedding 308) to conform to the set of dimensions corresponding to the multimodal embedding space 316 (e.g., the set of dimensions corresponding to the output of the image-embedding model 320).

Figure 4:
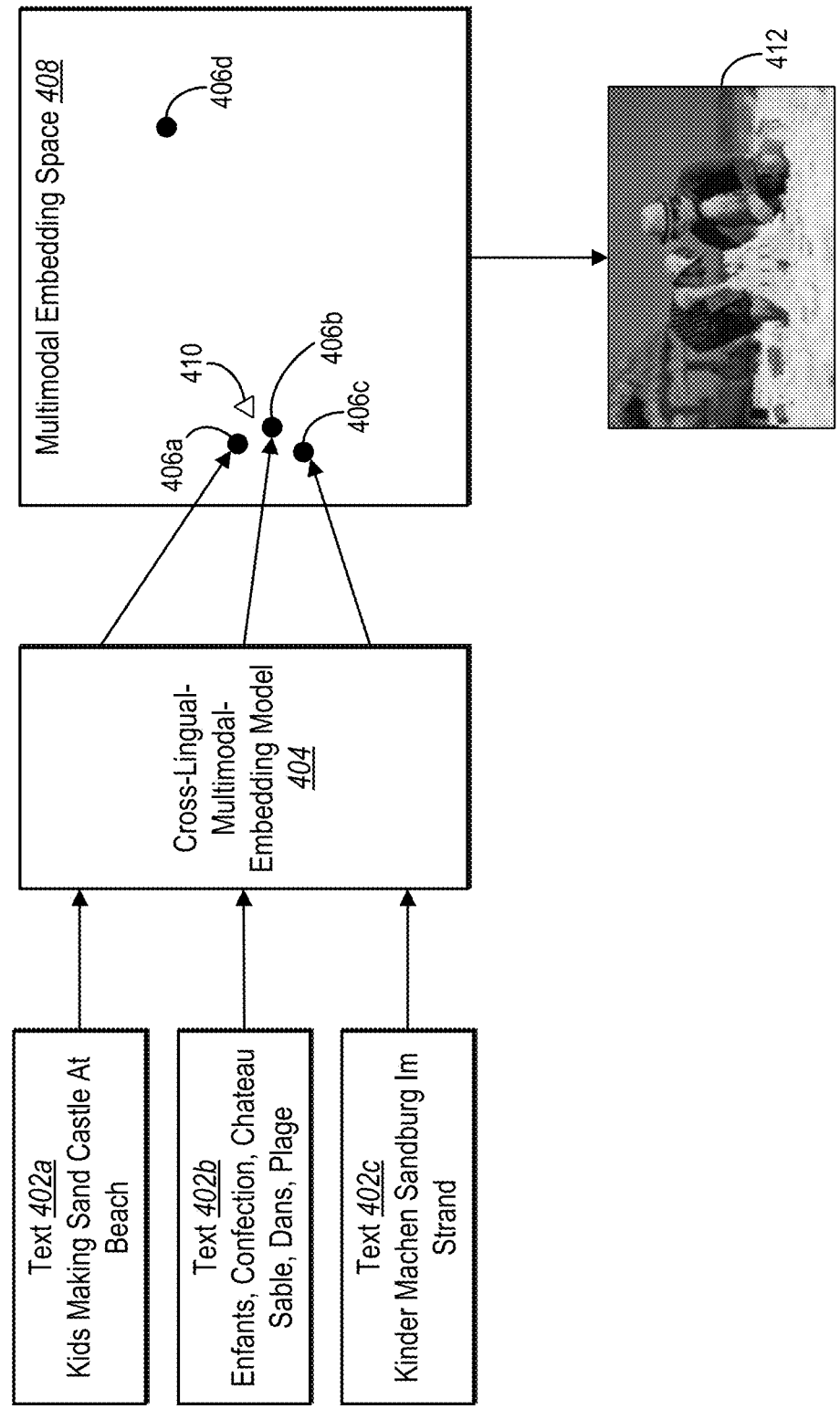
FIG. 4 illustrates a diagram for generating cross-lingual-multimodal embeddings within a multimodal embedding space for texts in various languages in accordance with one or more embodiments.

Thus, the cross-lingual image search system 106 generates cross-lingual-multimodal embeddings for texts and image embeddings for digital images within a multimodal embedding space. As indicated above, in some cases, the cross-lingual image search system 106 generates cross-lingual-multimodal embeddings for texts in various languages. FIG. 4 illustrates a diagram for generating cross-lingual-multimodal embeddings within a multimodal embedding space for texts in various languages in accordance with one or more embodiments.

As shown in FIG. 4, the cross-lingual image search system 106 provides the texts 402a-402c to a cross-lingual-multimodal-embedding model 404. FIG. 4 illustrates suggests provision of the texts 402a-402c together or simultaneously; however, it should be that the cross-lingual image search system 106 provides the texts 402a-402c to the cross-lingual-multimodal-embedding model 404 at separate times in some embodiments. To provide an example, in some instance, the cross-lingual image search system 106 provides the texts 402a-402c to the cross-lingual-multimodal-embedding model 404 in response to receiving separate queries corresponding to the texts 402a-402c.

As further shown in FIG. 4, even though the texts 402a-402c are in different languages, the texts 402a-402c correspond to one another. In other words, the texts 402a-402c include similar subject matter. For example, in some implementations, the texts 402a-402c correspond to a translation of one another. In some embodiments, the texts 402a-402c otherwise capture similar subject matter, including a similar context, intent, action(s), subject(s), object(s), etc. Indeed, in some implementations, the texts 402a-402c are part of queries that are submitted with the objective of retrieving similar digital images (e.g., the same digital image).

Additionally, as shown in FIG. 4, the cross-lingual image search system 106 utilizes a cross-lingual-multimodal-embedding model 404 to generate a cross-lingual-multimodal embedding 406a for the text 402a within a multimodal embedding space 408. Further, the cross-lingual image search system 106 utilizes the cross-lingual-multimodal-embedding model 404 to generate a cross-lingual-multimodal embedding 406b for the text 402b and a cross-lingual-multimodal embedding 406c for the text 402c within the multimodal embedding space 408. Though the texts 402a-402c correspond to one another, the cross-lingual image search system 106 utilizes the cross-lingual-multimodal-embedding model 404 to generate separate cross-lingual-multimodal embeddings within the multimodal embedding space 408. Indeed, even though the texts 402a-402c capture similar subject matter, the texts 402a-402c may differ based on how that subject matter is expressed. Thus, in some embodiments, the separate cross-lingual-multimodal embeddings represent these differences in expression.

Because the texts 402a-402c correspond to one another, the cross-lingual-multimodal embeddings 406a-406c are close to one another within the multimodal embedding space 408. In particular, the cross-lingual-multimodal embeddings 406a-406c are closer to one another than they are to other cross-lingual-multimodal embeddings (e.g., the cross-lingual-multimodal embedding 406d) that correspond to texts capturing different subject matter. Indeed, in some implementations, the cross-lingual image search system 106 utilizes the cross-lingual-multimodal-embedding model 404 to generate cross-lingual-multimodal embeddings corresponding to similar texts in close proximity within the multimodal embedding space 408 and to generate cross-lingual-multimodal embeddings corresponding to dissimilar texts to be farther apart. Thus, the cross-lingual image search system 106 captures the similarities and dissimilarities among various texts within the multimodal embedding space 408.

As further shown in FIG. 4, the multimodal embedding space 408 includes an image embedding 410 for a digital image. In some instances, the multimodal embedding space 408 includes a plurality of image embeddings for a plurality of digital images. In particular, the image embedding 410 is associated with a digital image that corresponds to the texts 402a-402c. In other words, the digital image associated with the image embedding 410 presents a visual representation of the subject matter (or a similar subject matter) captured by the texts 402a-402c or is otherwise relevant to the texts 402a-402c).

In FIG. 4, the image embedding 410 is in close proximity to the cross-lingual-multimodal embeddings 406a-406c within the multimodal embedding space. In particular, the image embedding 410 is closer to the cross-lingual-multimodal embeddings 406a-406c than it is to other cross-lingual-multimodal embeddings (e.g., the cross-lingual-multimodal embedding 406d) that correspond to texts capturing subject matter that is not represented (or, at least, not represented as well) within the digital image associated with the image embedding 410. As an example, the digital image associated with the image embedding 410 is either irrelevant or not as relevant to the text corresponding to the cross-lingual-multimodal embedding 406d.

Indeed, in some implementations, the cross-lingual image search system 106 generates, using an image-embedding model (not shown in FIG. 4), image embeddings for digital images that are relevant to texts so that the image embeddings are close to the corresponding cross-lingual-multimodal embeddings within the multimodal embedding space 408. Likewise, the cross-lingual image search system 106 generates the image embeddings for digital images that are irrelevant (or less relevant) to texts so that the image embeddings are distance from the corresponding cross-lingual-multimodal embeddings within the multimodal embedding space 408.

As further shown in FIG. 4, the cross-lingual image search system 106 retrieves the digital image corresponding to the image embedding 410 (e.g., the digital image 412) based on the proximity of the image embedding 410 to the cross-lingual-multimodal embeddings 406a-406c. In particular, upon receiving a query having a text (e.g., one of the texts 402a-402c), the cross-lingual image search system 106 determines that the digital image 412 corresponds to the text from the query based on the embedding distance between the image embedding 410 and the cross-lingual-multimodal embedding for the text within the multimodal embedding space 408. Indeed, because the cross-lingual image search system 106 generated the cross-lingual-multimodal embeddings 406a-406c close to one another within the multimodal space, the cross-lingual image search system 106 retrieves the digital image 412 based on the query containing the text 402a, the text 402b, or the text 402c.

Figure 5:
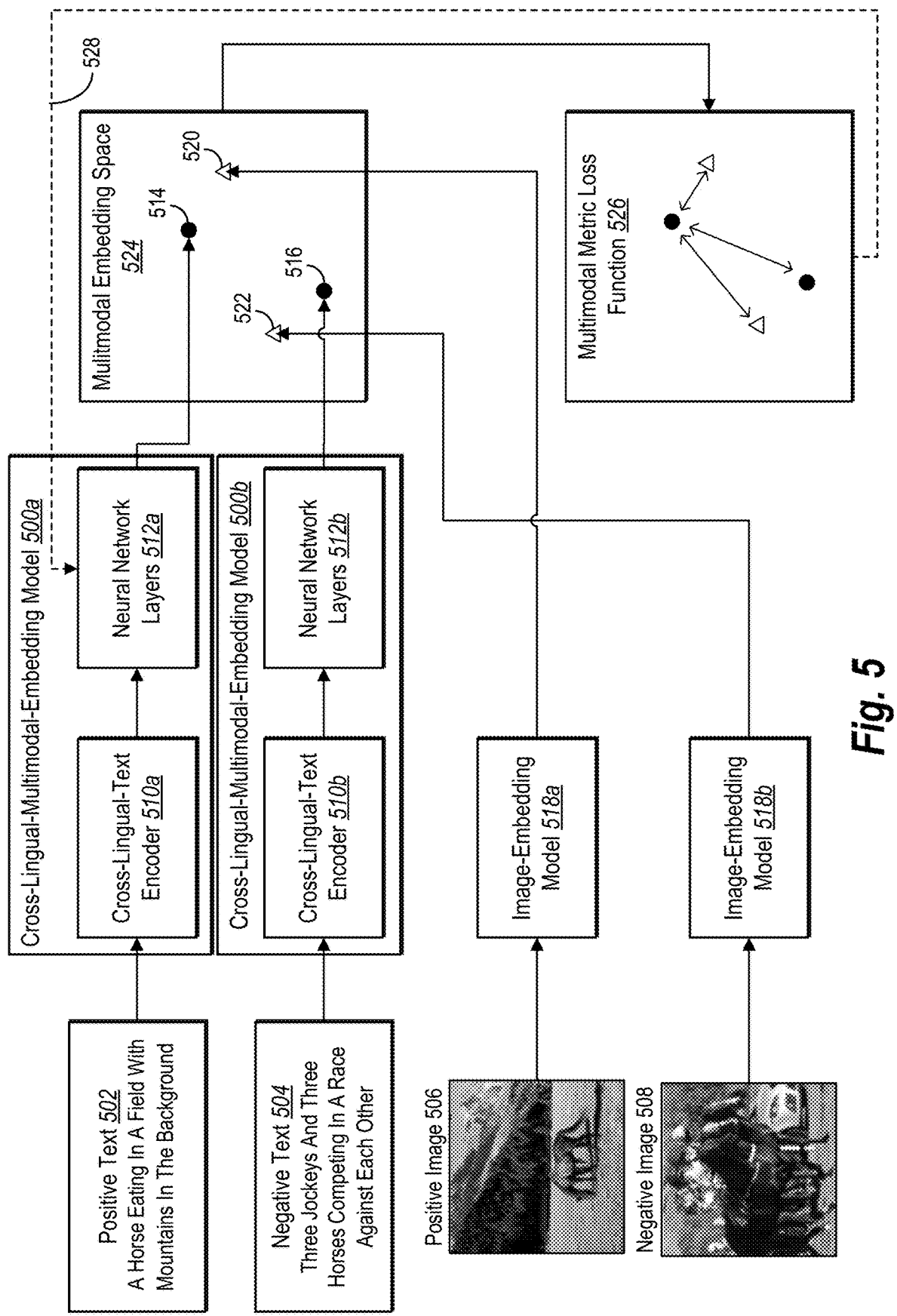
FIG. 5 illustrates a block diagram for training a cross-lingual-multimodal-embedding model in accordance with one or more embodiments.

As mentioned above, in one or more embodiments, the cross-lingual image search system 106 learns to retrieve digital images based on text queries. In particular, in some embodiments, the cross-lingual image search system 106 learns to retrieve digital images based on cross-lingual-multimodal embeddings and image embeddings within a multimodal embedding space. In some implementations, the cross-lingual image search system 106 learns to retrieve digital images by training a cross-lingual-multimodal-embedding model to generate cross-lingual-multimodal embeddings within a multimodal embedding space. FIG. 5 illustrates a block diagram for training a cross-lingual-multimodal-embedding model in accordance with one or more embodiments.

In particular, in some implementations, the cross-lingual image search system 106 trains the cross-lingual-multimodal-embedding model (e.g., at least one of the cross-lingual-multimodal-embedding models 500a-500b) to learn parameters of the cross-lingual-multimodal-embedding model that enable generation of cross-lingual-multimodal embeddings within the multimodal embedding space. In one or more embodiments, a parameter includes a value or factor that, at least partially, affects the analysis performed by a model in generating an output. For example, in some embodiments, a parameter includes a weight given to a function or operation performed by a model or a value analyzed or generated by the model affects the output generated by the model. In some embodiments, a parameter is associated with an image-embedding model or a cross-lingual-multimodal-embedding model. In some implementations, a parameter is more specifically associated with a cross-lingual-text encoder or a neural network layer of a cross-lingual-multimodal-embedding model.

As shown in FIG. 5, the cross-lingual image search system 106 identifies a positive text 502 and a positive image 506 corresponding to the positive text 502. Further, the cross-lingual image search system 106 identifies a negative text 504 and a negative image 508 corresponding to the negative text 504. In some cases, a positive text is referred to as an anchor text. In one or more embodiments, a positive text includes a text that corresponds to a positive image, and a positive image includes a digital image that corresponds to a positive text. Likewise, in some embodiments, a negative text includes a text that corresponds to a negative image, and a negative image includes a digital image that corresponds to a negative text. In other words, in some implementations, the labels "positive" and "negative" allow for distinctions among digital images and corresponding texts.

As further shown in FIG. 5, the positive text 502 includes an image description (referred to as a positive-image description) of the positive image 506. In other words, the positive text 502 provides a description of the visual image represented in the positive image 506. Similarly, the negative text 504 includes an image description (referred to as a negative-image description) of the negative image 508. In other words, the negative text 504 provides a description of the visual image represented in the negative image 508. Accordingly, with reference to the positive text 502, the positive image 506 is a corresponding digital image, and the negative image 508 is a non-corresponding digital image. Likewise, with reference to the negative text 504, the negative image 508 is a corresponding digital image, and the positive image 506 is a non-corresponding digital image.

In one or more embodiments, as shown in FIG. 5, the positive text 502 and the negative text 504 are in the same language. Indeed, the positive text 502 and the negative text 504 are in a sample language. In one or more embodiments, a sample language includes a language that is used to train a cross-lingual-multimodal-embedding model. In particular, in one or more embodiments, the cross-lingual image search system 106 trains the cross-lingual-multimodal-embedding model using a single language (e.g., the sample language). In some implementations, a sample language includes a language from the multiple languages on which the cross-lingual-multimodal-embedding model will operate after the training process. Though FIG. 5 illustrates a particular sample language (i.e., English), the cross-lingual image search system 106 utilizes one of various other languages as the sample language in various embodiments.

By using a single language to train the cross-lingual-multimodal-embedding model for implementation across various languages, the cross-lingual image search system 106 operates more flexibly than conventional systems. Indeed, the cross-lingual-multimodal-embedding model circumvents the need for data from multiple languages that is often required by conventional systems to train their models. Further, because the cross-lingual image search system 106 avoids the need for data from multiple languages, the cross-lingual image search system 106 avoids the inaccuracies caused by the lack of such available data. Accordingly, the cross-lingual image search system 106 provides improved training for the cross-lingual-multimodal-embedding model, leading to more accurate retrieval of digital images.

In one or more embodiments, the cross-lingual image search system 106 extracts the positive image 506 and the negative image 508 from a set of training digital images. Further, the cross-lingual image search system 106 utilizes a caption for the positive image 506 as the positive text 502 and utilizes a caption for the negative image 508 as the negative text 504. In some embodiments, if there are multiple captions for a digital image, the cross-lingual image search system 106 selects one of the captions using a random sampling.

In one or more embodiments, the cross-lingual image search system 106 identifies a hard negative sample from the set of training digital images to use as the negative image 508. For example, in some instances, the cross-lingual image search system 106 identifies hard negative samples to use as negative images utilizing an online negative sampling strategy described in Pranav Aggarwal et al., *Multitask Text-to-visual Embedding with Titles and Clickthrough Data*, CoRR, abs/1905.13339 (2019), which is incorporated herein by reference in its entirety.

As further illustrated in FIG. 5, the cross-lingual image search system 106 utilizes the cross-lingual-multimodal-embedding model 500a to generate a cross-lingual-multimodal embedding for the positive text 502 (referred to as a positive cross-lingual-multimodal embedding 514) within the multimodal embedding space 524. The cross-lingual image search system 106 further utilizes the cross-lingualmultimodal-embedding model 500b to generate a cross-lingual-multimodal embedding for the negative text 504 (referred to as a negative cross-lingual-multimodal embedding 516) within the multimodal embedding space 524. In particular, the cross-lingual image search system 106 utilizes a cross-lingual-text encoder 510a of the cross-lingual-multimodal-embedding model 500a to generate a text embedding for the positive text 502 (referred to as a positive-text embedding—not shown in FIG. 5) and utilizes neural network layers 512a of the cross-lingual-multimodal-embedding model 500a to transform the positive-text embedding into the positive cross-lingual-multimodal embedding 514. Likewise, the cross-lingual image search system 106 utilizes a cross-lingual-text encoder 510b of the cross-lingual-multimodal-embedding model 500b to generate a text embedding for the negative text 504 (referred to as a negative-text embedding—not shown in FIG. 5) and utilizes neural network layers 512b of the cross-lingual-multimodal-embedding model 500b to transform the negative-text embedding into the negative cross-lingual-multimodal embedding 516.

As shown in FIG. 5, in some implementations, the cross-lingual image search system 106 utilizes separate cross-lingual-multimodal-embedding models 500a-500b. In particular, the cross-lingual image search system 106 utilizes separate cross-lingual-text encoders 510a-510b and separate neural network layers 512a-512b. In some such cases, the neural network layers 512a-512b share weights—and/or cross-lingual-text encoders 510a-510b share weights—that the cross-lingual image search system 106 adjusts during training iterations. In some embodiments, however, the cross-lingual image search system 106 utilizes the same cross-lingual-text encoder and the same neural network layers (e.g., the same cross-lingual-multimodal-embedding model) to generate the positive cross-lingual-multimodal embedding 514 and the negative cross-lingual-multimodal embedding 516.

As further illustrated by FIG. 5, in some implementations, the cross-lingual image search system 106 utilizes separate image-embedding models 518a-518b to generate the positive-image embedding 520 and the negative-image embedding 522. Indeed, the cross-lingual image search system 106 utilizes the image-embedding model 518a to generate an image embedding for the positive image 506 (referred to as a positive-image embedding 520) within the multimodal embedding space 524. Further, the cross-lingual image search system 106 utilizes the image-embedding model 518b to generate an image embedding for the negative image 508 (referred to as a negative-image embedding 522) within the multimodal embedding space 524. In some embodiments, however, the cross-lingual image search system 106 utilizes the same image-embedding model to generate the positive-image embedding 520 and the negative-image embedding 522. Regardless of the number of image-embedding models, in certain implementations, the cross-lingual image search system 106 does not adjust parameters of one or more image-embedding models during training iterations, but instead uses one or more pre-trained image-embedding models.

Thus, the cross-lingual image search system 106 generates, within the multimodal embedding space 524, the positive cross-lingual-multimodal embedding 514 for the positive text 502, the negative cross-lingual-multimodal embedding 516 for the negative text 504, the positive-image embedding 520 for the positive image 506, and the negative-image embedding 522 for the negative image 508. In one or more embodiments, the cross-lingual image search system 106 further determines embedding distances in the multi-modal embedding space 524 among the positive cross-lingual-multimodal embedding 514, the negative cross-lingual-multimodal embedding 516, the positive-image embedding 520, and the negative-image embedding 522. For example, in some embodiments, the cross-lingual image search system 106 determines a first embedding distance between the positive cross-lingual-multimodal embedding 514 and the positive-image embedding 520, a second embedding distance between the positive cross-lingual-multimodal embedding 514 and the negative cross-lingual-multimodal embedding 516, and a third embedding distance between the positive cross-lingual-multimodal embedding 514 and the negative-image embedding 522.

In one or more embodiments, the cross-lingual image search system 106 determines a loss based on the embedding distances within the multimodal embedding space 524. For example, as shown in FIG. 5, the cross-lingual image search system 106 utilizes a multimodal metric loss function 526 to determine a multimodal metric loss ("M3L") based on the determined embedding distances. In one or more embodiments, a multimodal metric loss function includes a loss function that determines a loss (e.g., an error) among embedding distances within a multimodal embedding space. For example, in some implementations, a multimodal metric loss function includes a loss function that facilitates reduction of an embedding distance between a cross-lingual-multimodal embedding for an anchor text (also referred to as a positive text) and an image embedding for a positive image within a multimodal embedding space. In some implementations, a multimodal metric loss function further facilitates increasing an embedding distance between the cross-lingual-multimodal embedding for the anchor text and a cross-lingual-multimodal embedding for a negative text as well as increasing an embedding distance between the cross-lingual-multimodal embedding for the anchor text and an image embedding for a negative image. In other words, reducing the loss (i.e., error) determined using the multimodal metric loss function will optimize the embedding distances within the multimodal embedding space. In one or more embodiments, a multimodal metric loss includes a loss (e.g., an error) determined using a multimodal metric loss function.

Indeed, in some embodiments, the cross-lingual image search system 106 determines a multimodal metric loss using the multimodal metric loss function 526. In one or more embodiments, the cross-lingual image search system 106 determines the multimodal metric loss using the multimodal metric loss function 526 as follows:

$$L_{M3} = \frac{\alpha_1 * d(te_{an}, im_p)^\rho}{d(te_{an}, im_n)^\rho} + \frac{\alpha_2 * d(te_{an}, im_p)^\rho}{d(te_{an}, te_n)^\rho} \quad (1)$$

In function 1, $te_{an}$ refers to the positive cross-lingual-multimodal embedding for the anchor text (e.g., the positive text), $te_n$ refers to the negative cross-lingual-multimodal embedding for the negative text, $im_p$ refers to the positive-image embedding for the positive image, and $im_n$ refers to the negative-image embedding for the negative image. Further, in function 1, d (x, y) refers to the square of the embedding distance between x and y (e.g., the embeddings represented by x and y). Additionally, p represents a sensitivity parameter. In particular, p controls the sensitivity of the multimodal metric loss to changes in the embedding distances.

In one or more embodiments, the cross-lingual image search system 106 back propagates the determined multimodal metric loss to the cross-lingual-multimodal-embedding model 500a. In particular, the cross-lingual image search system 106 back propagates the determined multimodal metric loss to the neural network layers 512a (as shown by the dashed line 528) to optimize the neural network layers 512a by modifying the parameters. Though not shown in FIG. 5, in some embodiments, the cross-lingual image search system 106 further back propagates the determined multimodal metric loss to the neural network layers 512b of the cross-lingual-multimodal-embedding model 500b (e.g., where the cross-lingual image search system 106 utilizes the separate cross-lingual-multimodal-embedding models 500a-500b). Indeed, the cross-lingual image search system 106 modifies the parameters of the neural network layers 512a to minimize the error of the cross-lingual-multimodal-embedding model 500a (e.g., the error of the neural network layers 512a) in generating cross-lingual-multimodal embeddings within the multimodal embedding space 524.

Though FIG. 5 illustrates training the cross-lingual-multimodal-embedding model 500a having one refinement iteration, in some embodiments, the cross-lingual image search system 106 trains the cross-lingual-multimodal-embedding model 500a using multiple refinement iterations. In one or more embodiments, with each iteration of training, the cross-lingual image search system 106 gradually improves the accuracy with which the cross-lingual-multimodal-embedding model 500a generates cross-lingual-multimodal embeddings within a multimodal embedding space. Indeed, the cross-lingual image search system 106 learns parameters of the cross-lingual-multimodal-embedding model 500a (e.g., of the neural network layers 512a of the cross-lingual-multimodal embedding model 500a) that can be used to accurately generate the cross-lingual-multimodal embeddings. More specifically, in one or more embodiments, by using an iterative training process, the cross-lingual image search system 106 modifies the parameters of the cross-lingual-multimodal embedding model 500a (e.g., of the neural network layers 512a) to decrease embedding distances in the multimodal embedding space between positive cross-lingual-multimodal embeddings for positive texts and positive-image embeddings for positive images; increase embedding distances in the multimodal embedding space between the positive cross-lingual-multimodal embeddings for the positive texts and negative-image embeddings for negative images; and increase embedding distances between the positive cross-lingual-multimodal embeddings for the positive texts and negative cross-lingual-multimodal embeddings for negative texts.

FIG. 5 only illustrates modifying parameters of the neural network layers of a cross-lingual-multimodal-embedding model. Indeed, in some implementations, the cross-lingual image search system 106 utilizes a pre-trained cross-lingual-text encoder and maintains the parameters of the pre-trained cross-lingual-text encoder during training and implementation. However, in some embodiments, the cross-lingual image search system 106 also modifies parameters of the cross-lingual-text encoder of the cross-lingual-multimodal-embedding model. In some embodiments, the cross-lingual image search system 106 trains the cross-lingual-text encoder and the neural network layers at the same time. In some implementations, however, the cross-lingual image search system 106 trains the cross-lingual-text encoder and the neural network layers separately. Further, FIG. 5 illustrates the cross-lingual image search system 106 maintaining parameters of an image-embedding model while modifying the parameters of the cross-lingual-multimodal-embedding model (e.g., of the neural network layers of the cross-lingual-multimodal-embedding model). Indeed, as with the cross-lingual-text encoder, in some embodiments, the cross-lingual image search system 106 utilizes a pre-trained image-embedding model and maintains the parameters of the pre-trained image-embedding model during training and implementation. In some implementations, however, the cross-lingual image search system 106 modifies parameters of the image-embedding model during training as well.

Thus, in one or more embodiments, the cross-lingual image search system 106 trains a cross-lingual-multimodal-embedding model to generate cross-lingual-multimodal embeddings within a multimodal embedding space. In particular, the cross-lingual image search system 106 learns parameters of the cross-lingual-multimodal-embedding model that enable the cross-lingual-multimodal-embedding model to generate the cross-lingual-multimodal embeddings.

Accordingly, in some implementations, the algorithm and acts described with reference to FIG. 5 comprise the corresponding structure for performing a step for learning parameters of a cross-lingual-multimodal-embedding model based on embedding distances between embeddings within a multimodal embedding space.

Figure 6:
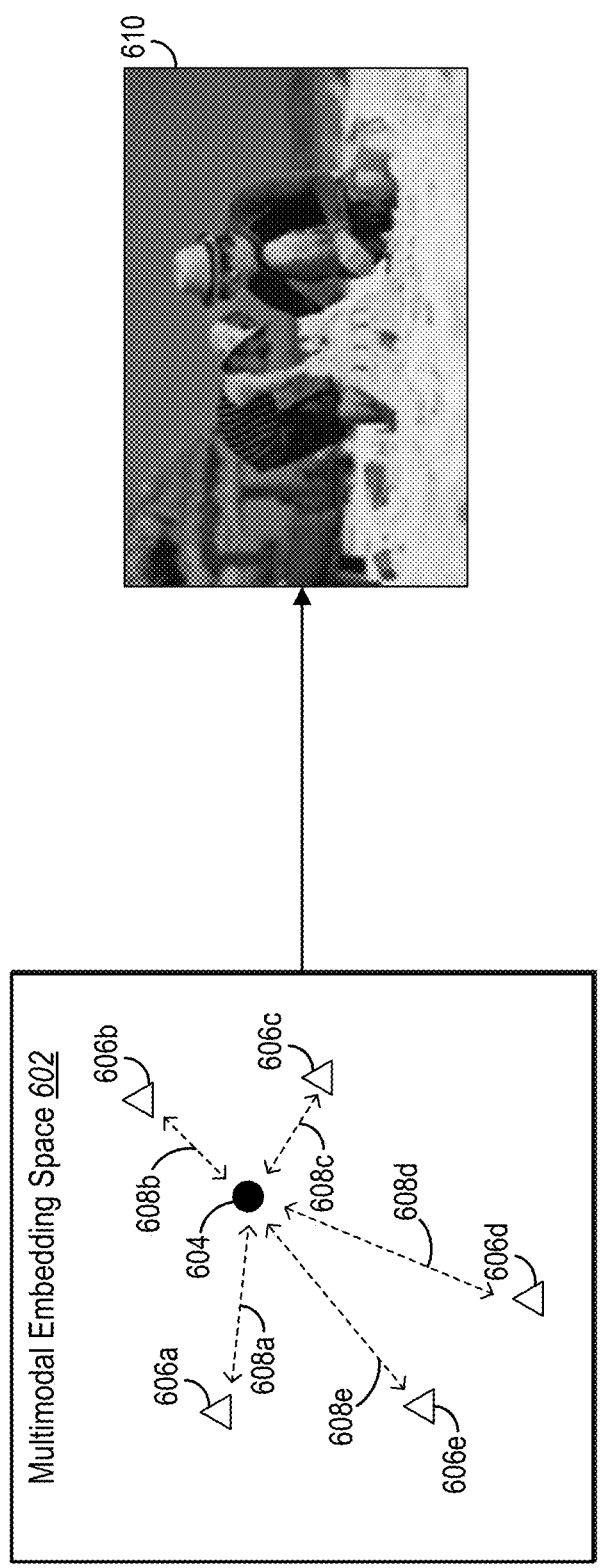
FIG. 6 illustrates a diagram for identifying a digital image that corresponds to a text from a query based on embedding distances within a multimodal embedding space in accordance with one or more embodiments.

As mentioned above, in one or more embodiments, the cross-lingual image search system 106 identifies a digital image that corresponds to (e.g., is relevant to) the text of a query. In particular, the cross-lingual image search system 106 identifies the digital image as corresponding to the text of the query based on an embedding distance between the image embedding for the digital image and a cross-lingual-multimodal embedding for the text from the query within a multimodal embedding space. FIG. 6 illustrates a diagram for identifying a digital image that corresponds to a text from a query based on embedding distances within a multimodal embedding space in accordance with one or more embodiments.

As shown in FIG. 6, a multimodal embedding space 602 includes a cross-lingual-multimodal embedding 604 for text from a query and image embeddings 606a-606e for digital images. Further, as shown, the cross-lingual image search system 106 determines embedding distances (represented by the arrows 608a-608e) between the cross-lingual-multimodal embedding 604 and the image embeddings 606a-606e.

In one or more embodiments, the cross-lingual image search system 106 determines which of the digital images corresponds to or corresponds best to (e.g., is most relevant to) the text from the query based on the determined embedding distances. For example, in one or more embodiments, the cross-lingual image search system 106 identifies an image embedding for a digital image that corresponds to or corresponds best to the text from the query based on the embedding distances. For example, in some instances, the cross-lingual image search system 106 identifies the image embedding that is closest to the cross-lingual-multimodal embedding 604 (e.g., has the shortest embedding distance) as the image embedding for the digital image that corresponds to or corresponds best to the text from the query.

In some cases, the cross-lingual image search system 106 utilizes a threshold embedding distance to filter out image embeddings that do not correspond to (e.g., are too irrelevant) to the text from the query. For example, where no image embeddings fall within the threshold embedding distance of the cross-lingual-multimodal embedding 604, the cross-lingual image search system 106 determines that there are not any available digital images that are relevant to the query. In some cases, based on identifying the image embedding that is closest to the cross-lingual-multimodal embedding 604, the cross-lingual image search system 106 retrieves the corresponding digital image (e.g., the digital image 610). As indicated above, in some embodiments, the cross-lingual image search system 106 further provides the digital image for display on a client device, such as the client device that submitted the query.

In one or more embodiments, the cross-lingual image search system 106 identifies a plurality of digital images that correspond to (e.g., are relevant to) the text from a query. For example, in at least one implementation, the cross-lingual image search system 106 identifies a threshold number of digital images that correspond to the text from a query. In some instances, the cross-lingual image search system 106 identifies a threshold number of digital images by identifying the threshold number of image embeddings that are closest to the cross-lingual-multimodal embedding 604 within the multimodal embedding space 602. Accordingly, the cross-lingual image search system 106 retrieves the digital images corresponding to the threshold number of image embeddings and provides those digital images for display on a client device. In some implementations, the cross-lingual image search system 106 ranks the retrieved digital images based on relevancy to the query and provides the digital images for display in order of ranking.

As mentioned above, in one or more embodiments, the cross-lingual image search system 106 operates more accurately than conventional systems. In particular, the cross-lingual image search system 106 generates image embeddings and cross-lingual-multimodal embeddings within a multimodal embedding space that more accurately reflects similarities and dissimilarities between texts and/or digital images. Accordingly, the cross-lingual image search system 106 can retrieve digital images that are relevant to the text from a query with a higher degree of accuracy.

Figure 8:
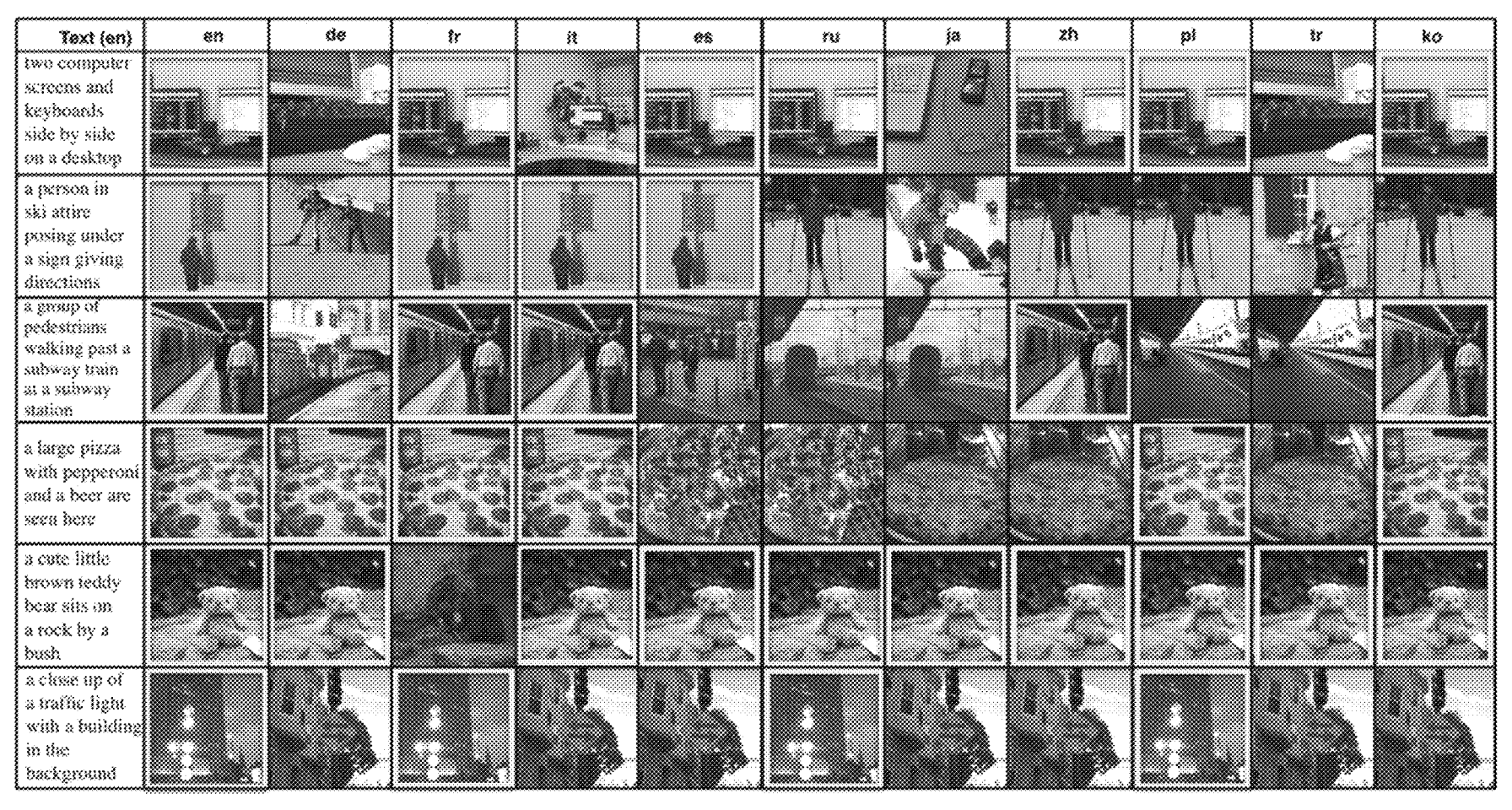

Researchers have conducted studies to determine the accuracy of one or more embodiments of the cross-lingual image search system 106 in retrieving digital images that corresponded to the text of a query. FIG. 7 illustrates a table reflecting quantitative testing results regarding the effectiveness of the cross-lingual image search system 106 in accordance with one or more embodiments. FIG. 8 illustrates graphical representations reflecting qualitative testing results regarding the effectiveness of the cross-lingual image search system 106 in accordance with one or more embodiments.

Specifically, FIG. 7 illustrates a table comparing the performance of two embodiments of the cross-lingual image search system 106 trained using a multimodal metric loss function (labeled "LASER$_{M3L}$" and "USE$_{M3L}$") to the performance of two models trained using a positive aware triplet ranking ("PATR") loss function (labeled as "LASER$_{PATR}$" and "USE$_{PATR}$"). For context, the "LASER" model refers to the encoder discussed above and as described by Artetxe and Schwenk, and the "USE" model refers to the encoder discussed above and as described by Yang. The researchers implemented the PATR loss function to train the LASER$_{PATR}$ model and the USE$_{PATR}$ model as follows:

$$L_{PATR}=d(te_{an},im_p)+\max(0,\eta-d(te_{an},im_n)) \quad (2)$$

In function 2, η penalizes the distance between the anchor and negative image, therefore controlling the tightness of the clusters. During the experiments, the researchers set η=1100, which provided the best performance.

During the experiments, the researchers used a learning rate of 0.001 along with Adam optimizer (beta1=0.99).

Further, for the embodiments of the cross-lingual image search system 106, the researchers utilized three sets of neural network layers with dropout of [0.2, 0.1, 0.0] for the fully connected layers. Further, the researchers set the dimensions of the fully connected layers to [1024, 2048, 2048], respectively. Additionally, the researchers used a large batch size of 128 and trained the models for 50 epochs.

The researchers further created a dataset on which to conduct the experiments. In particular, the researchers started with the MSCOCO2014 dataset described by Tsung-Yi Lin et al., *Microsoft COCO: Common Object in Context*, CoRR, abs/1405.0312 (2014), which is incorporated herein by reference in its entirety. Further, the researchers applied, to the dataset, a train-val-test split described by Rajendran et al., *Bridge Correlation Neural Networks for Multilingual Multimodal Representation Learning*, Proceedings of the 2016 Conference of the North American Chapter of the Association for Computational Linguistics: Human Language Technologies, pp. 171-81 (2016), which is incorporated herein by reference in its entirety.

To create the test dataset, the researchers converted the MSCOCO2014 dataset into 1K image-text pairs by sampling the longest image for each caption. Because the MSCOCO2014 dataset is only in English, the researchers used French and German translations of the text, Japanese annotations for the 1K images, and test human translated captions for the remaining languages. In other words, except for the Japanese annotations, the researchers used direct translations of the English text.

The table in FIG. 7 measures the performance of the tested models using the recall@10 metric for eleven languages. As shown by the table of FIG. 7, the cross-lingual image search system 106 provided comparable performance for all tested languages. Particularly, the embodiment of the cross-lingual image search system 106 labeled USE$_{M3L}$ provided the best results and performed significantly better than all other models for ten of the eleven tested languages. Both embodiments of the cross-lingual image search system 106 provided the best results for the English language as that is the language used in training the models.

FIG. 8 illustrates a graphical representation of digital images retrieved by an embodiment of the cross-lingual image search system 106 for queries comprising particular texts. In particular, FIG. 8 illustrates the digital images retrieved using the USE$_{M3L}$ embodiment of the cross-lingual image search system 106. Further, though the contents of the texts are only shown in English, the texts were provided in the various different languages. Further, the retrieved digital images shown in FIG. 8 are those determined to be most relevant to the corresponding text (e.g., ranked first in relevancy). As shown in FIG. 8, the cross-lingual image search system 106 captures all objects described in the texts in most results across all languages (those digital images being denoted by a white border).

While some languages for the third and sixth tested texts do not retrieve the desired image as the most relevant, the retrieved images still cover the object concepts described in their corresponding texts. Further, the digital image retrieved for the French translation of the fifth tested text includes the "rock" and "bush" objects but not the "teddy bear." This is because the French caption "un petit ourson brun mignon assis sur un rocher par un buisson" does not cover the "teddy" concept.

Figure 9:
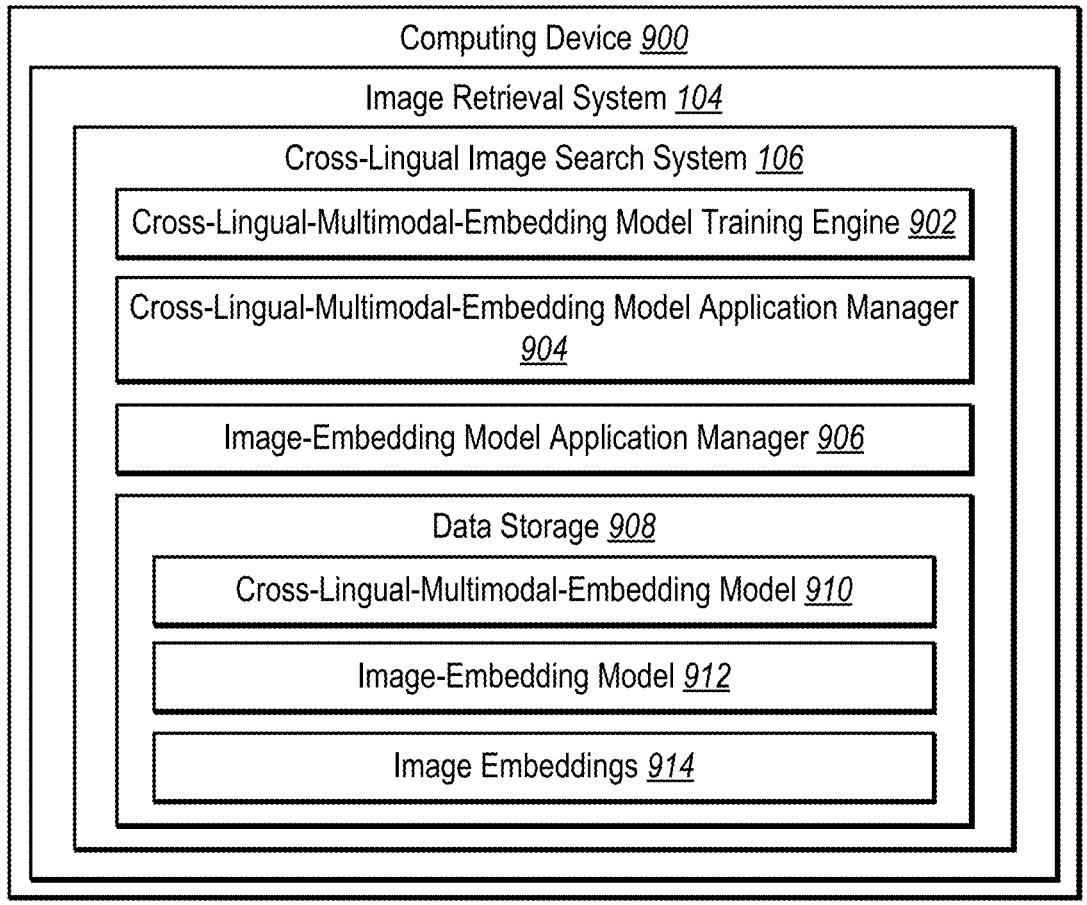
FIG. 9 illustrates an example schematic diagram of a cross-lingual image search system in accordance with one or more embodiments.

Turning now to FIG. 9, additional detail will be provided regarding various components and capabilities of the cross-lingual image search system 106. In particular, the FIG. 9 illustrates the cross-lingual image search system 106 implemented by the computing device 900 (e.g., the server(s) 102, the client devices 110*a*-110*n*, and/or the third-party server 114 as discussed above with reference to FIG. 1). Additionally, the cross-lingual image search system 106 is also part of the image retrieval system 104. As shown, in one or more embodiments, the cross-lingual image search system 106 includes, but is not limited to, a cross-lingual-multimodal-embedding model training engine 902, a cross-lingual-multimodal-embedding model application manager 904, an image-embedding model application manager 906, and data storage 908 (which includes cross-lingual-multimodal-embedding model 910, image-embedding model 912, and image embeddings 914).

As just mentioned, and as illustrated in FIG. 9, the cross-lingual image search system 106 includes the cross-lingual-multimodal-embedding model training engine 902. In one or more embodiments, the cross-lingual-multimodal-embedding model training engine 902 trains a cross-lingual-multimodal-embedding model to generate cross-lingual-multimodal embeddings for texts within a multimodal embedding space. In particular, the cross-lingual-multimodal-embedding model training engine 902 trains one or more neural network layers of the cross-lingual-multimodal-embedding model to transform text embeddings for texts into cross-lingual-multimodal embeddings and to conform to the set of dimensions that corresponds to the multimodal embedding space. Indeed, the cross-lingual-multimodal-embedding model training engine 902 iteratively modifies parameters of the one or more neural network layers to learn to generate cross-lingual-multimodal embeddings from text embeddings. In some instances, however, the cross-lingual-multimodal-embedding model training engine 902 further trains the cross-lingual-text encoder (e.g., by iteratively modifying its parameters) to generate text embeddings for texts.

As further shown in FIG. 9, the cross-lingual image search system 106 includes the cross-lingual-multimodal-embedding model application manager 904. In one or more embodiments, the cross-lingual-multimodal-embedding model application manager 904 utilizes a cross-lingual-multimodal-embedding model (e.g., the cross-lingual-multimodal-embedding model trained by the cross-lingual-multimodal-embedding model training engine 902) to generate cross-lingual-embeddings for texts from queries within a multimodal embedding space. In particular, the cross-lingual-multimodal-embedding model application manager 904 utilizes a cross-lingual-text encoder of the cross-lingual-multimodal-embedding model to generate a text embedding for a text and further utilizes one or more neural network layers of the cross-lingual-multimodal-embedding model to transform the text embedding into a cross-lingual-multimodal embedding for the text.

Additionally, as shown in FIG. 9, the cross-lingual image search system 106 includes the image-embedding model application manager 906. In one or more embodiments, the image-embedding model application manager 906 utilizes an image-embedding model to generate image embeddings for digital images within a multimodal embedding space.

As further shown in FIG. 9, the cross-lingual image search system 106 includes data storage 908. In particular, as shown, data storage 908 includes the cross-lingual-multimodal-embedding model 910, the image-embedding model 912, and the image embeddings 914. In one or more embodiments, the cross-lingual-multimodal-embedding model 910 stores a cross-lingual-multimodal-embedding model trained by the cross-lingual-multimodal-embedding model training engine 902 and used by the cross-lingual-multimodal-embedding model application manager 904 to generate cross-lingual-multimodal embeddings for texts within a multimodal embedding space. In some embodiments, the image-embedding model 912 stores an image-embedding model used by the image-embedding model application manager 906 to generate image embeddings for digital images within the multimodal embedding space. In some implementations, the image embeddings 914 stores the image embeddings 914 generated by the image-embedding model application manager 906. Indeed, as mentioned above, in some implementations, the cross-lingual image search system 106 generates and stores image embeddings for digital images before receiving queries.

Each of the components 902-914 of the cross-lingual image search system 106 can include software, hardware, or both. For example, the components 902-914 can include one or more instructions stored on a computer-readable storage medium and executable by processors of one or more computing devices, such as a client device or server device. When executed by the one or more processors, the computer-executable instructions of the cross-lingual image search system 106 can cause the computing device(s) to perform the methods described herein. Alternatively, the components 902-914 can include hardware, such as a special-purpose processing device to perform a certain function or group of functions. Alternatively, the components 902-914 of the cross-lingual image search system 106 can include a combination of computer-executable instructions and hardware.

Furthermore, the components 902-914 of the cross-lingual image search system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-914 of the cross-lingual image search system 106 may be implemented as a stand-alone application, such as a desktop or mobile application. Furthermore, the components 902-914 of the cross-lingual image search system 106 may be implemented as one or more web-based applications hosted on a remote server. Alternatively, or additionally, the components 902-914 of the cross-lingual image search system 106 may be implemented in a suite of mobile device applications or "apps." For example, in one or more embodiments, the cross-lingual image search system 106 comprises or operate in connection with digital software applications such as ADOBE® INDESIGN® or ADOBE® CREATIVE CLOUD®. "ADOBE," "INDESIGN," and "CREATIVE CLOUD" are either registered trademarks or trademarks of Adobe Inc. in the United States and/or other countries.

Figure 10:
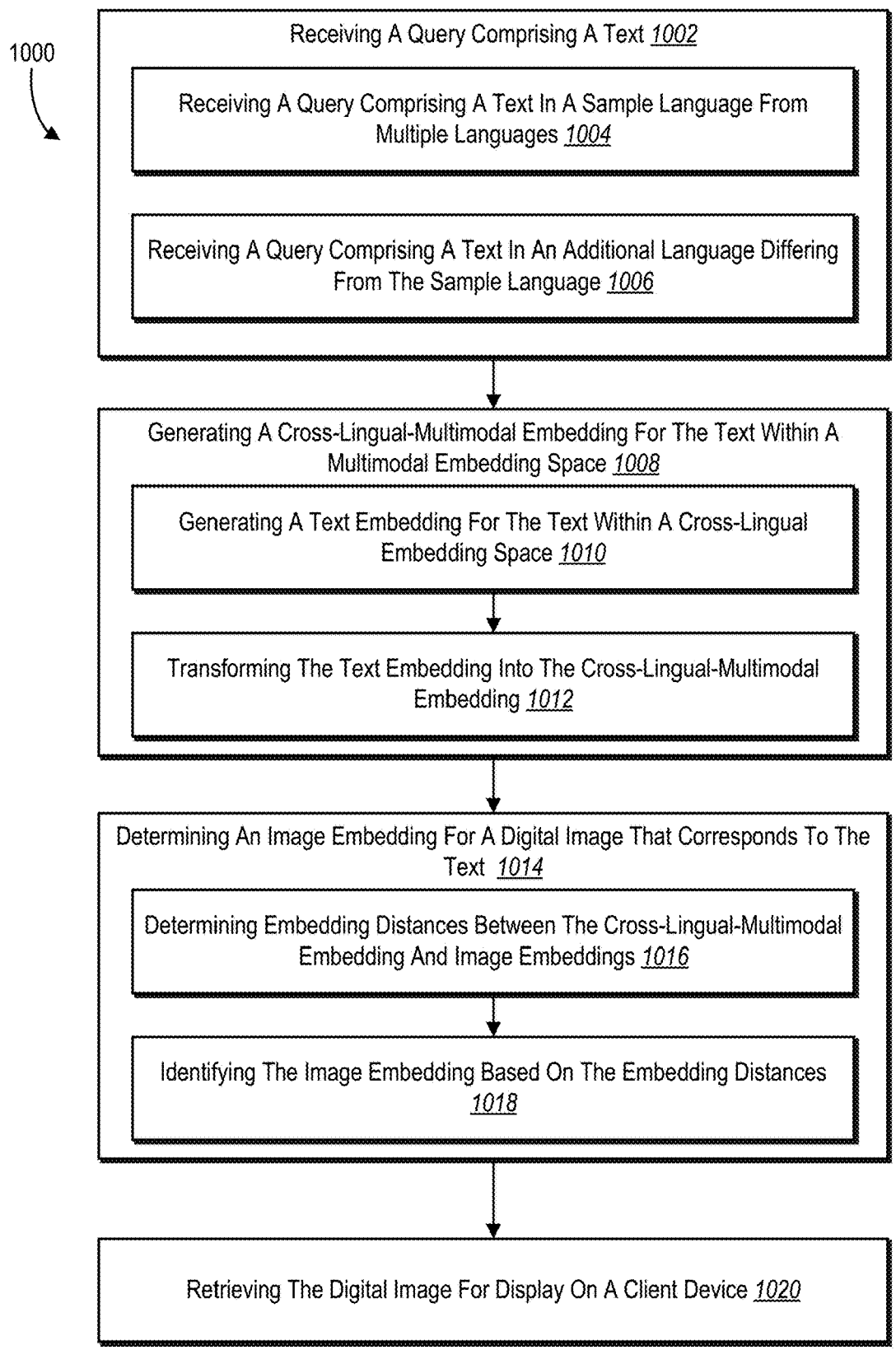
FIG. 10 illustrates a flowchart of a series of acts for retrieving a digital image in response to a query in accordance with one or more embodiments.

FIGS. 1-9, the corresponding text and the examples provide a number of different methods, systems, devices, and non-transitory computer-readable media of the cross-lingual image search system 106. In addition to the foregoing, one or more embodiments can also be described in terms of flowcharts comprising acts for accomplishing the particular results as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

As mentioned, FIG. 10 illustrates a flowchart of a series of acts 1000 for retrieving a digital image in response to a query in accordance with one or more embodiments. While FIG. 10 illustrates acts according to one embodiment, alternative embodiments may omit, add to, reorder, and/or modify any of the acts shown in FIG. 10. In some implementations, the acts of FIG. 10 are performed as part of a method. For example, in some embodiments, the acts of FIG. 10 are performed as part of a computer-implemented method for retrieving digital images in response to text queries of different languages. In some instances, a non-transitory computer-readable medium stores instructions thereon that, when executed by at least one processor, cause a computing device to perform the acts of FIG. 10. In some embodiments, a system performs the acts of FIG. 10. For example, in one or more embodiments, a system includes at least one memory device comprising a cross-lingual-multimodal-embedding model and an image-embedding model. The system further includes at least one server device configured to cause the system to perform the acts of FIG. 10.

The series of acts 1000 includes an act 1002 of receiving a query comprising a text. For example, in some embodiments, the act 1002 involves receiving, from a client device, a query comprising text in a language from multiple languages.

As shown in FIG. 10, the act 1002 includes a sub-act 1004 of receiving a query comprising a text in a sample language from multiple languages. Indeed, in one or more embodiments, the cross-lingual image search system 106 receives a query having a text in the same language that was used to train a cross-lingual-multimodal-embedding model. In particular, the cross-lingual image search system 106 receives a query having a text in the same language as the positive texts and negative texts used in training the cross-lingual-multimodal-embedding model.

As further shown in FIG. 10, the act 1002 includes an alternative sub-act 1006 of receiving a query comprising a text in an additional language differing from the sample language. Indeed, in one or more embodiments, receiving the query comprising the text in the language from the multiple languages comprises receiving the query comprising the text in the language differing from a sample language corresponding to the image texts upon which the parameters of the cross-lingual-multimodal-embedding model were modified. For example, the cross-lingual image search system 106 receives a query having a text in a language that differs from the language of the positive texts and negative texts used to train the cross-lingual-multimodal-embedding model.

Further, the series of acts 1000 includes an act 1008 of generating a cross-lingual-multimodal embedding for the text within a multimodal embedding space. To illustrate, in some instances, the act 1008 involves generating, within a multimodal embedding space, a cross-lingual-multimodal embedding for the text from the query utilizing the cross-lingual-multimodal-embedding model comprising learned parameters. As another example, in some embodiments, the act 1008 involves generating, within a multimodal embedding space for image embeddings and cross-lingual-multimodal embeddings of the multiple languages, a cross-lingual-multimodal embedding for the text from the query utilizing a cross-lingual-multimodal-embedding model comprising parameters modified to reduce embedding distances between cross-lingual-multimodal embeddings for image texts and positive-image embeddings for corresponding positive images and to increase embedding distances between the cross-lingual-multimodal embeddings and negative-image embeddings for non-corresponding negative images.

As shown in FIG. 10, the act 1008 includes a sub-act 1010 of generating a text embedding for the text within a cross-lingual embedding space. For example, in one or more embodiments, the sub-act 1010 involves generating, utilizing a cross-lingual-text encoder of the cross-lingual-multimodal-embedding model and within a cross-lingual embedding space for text embeddings of the multiple languages, a sentence-level embedding for the text from the query. For example, in some implementations, the cross-lingual image search system 106 generates the sentence-level embedding for the text from the query by generating the sentence-level embedding having a set of dimensions that differs from a set of dimensions corresponding to the multimodal embedding space.

Further, as shown in FIG. 10, the act 1008 includes a sub-act 1012 of transforming the text embedding into the cross-lingual-multimodal embedding. For example, in one or more embodiments, the sub-act 1012 involves transforming, utilizing one or more neural network layers of the cross-lingual-multimodal-embedding model, the sentence-level embedding into the cross-lingual-multimodal embedding within the multimodal embedding space. For example, in some implementations, the cross-lingual image search system 106 transforms the sentence-level embedding into the cross-lingual-multimodal embedding by transforming the sentence-level embedding to conform to the set of dimensions corresponding to the multimodal embedding space and into the cross-lingual-multimodal embedding.

Additionally, the series of acts 1000 includes an act 1014 of determining an image embedding for a digital image that corresponds to the text. For instance, in some implementations, the act 1014 involves determining an image embedding for a digital image corresponding to the text from the query based on an embedding distance within the multimodal embedding space between the cross-lingual-multimodal embedding for the text and the image embedding.

As shown in FIG. 10, the act 1014 includes a sub-act 1016 of determining embedding distances between the cross-lingual-multimodal embedding and image embeddings. For example, the cross-lingual image search system 106 determines an embedding distance for each pair comprising the cross-lingual-multimodal embedding and one of the image embeddings in the multimodal embedding space.

Further, as shown in FIG. 10, the act 1014 includes a sub-act 1018 of identifying the image embedding based on the embedding distances. Indeed, in at least one implementation, the cross-lingual image search system 106 determines the image embedding for the digital image corresponding to the text from the query based on the embedding distance within the multimodal embedding space between the cross-lingual-multimodal embedding for the text and the image embedding by determining the image embedding is closer to the cross-lingual-multimodal embedding within the multimodal embedding space than other image embeddings within the multimodal embedding space.

The series of acts 1000 also includes an act 1020 of retrieving the digital image for display on a client device. In one or more embodiments, the act 1020 involves in response to the query, retrieving the digital image for display on the client device. Indeed, in some embodiments, the cross-lingual image search system 106 retrieves the digital image for display on the client device that submitted the query. In some implementations, the cross-lingual image search system 106 further provides the digital image to the client device.

Accordingly, in one or more embodiments, the cross-lingual image search system 106 determines, for display on the client device, a digital image that corresponds to the query based on an embedding distance within the multimodal embedding space between an image embedding for the digital image and the cross-lingual-multimodal embedding for the query. As suggested above with reference to the act 1014, in one or more embodiments, the cross-lingual image search system 106 determines, for display on the client device, the digital image that corresponds to the query based on the embedding distance within the multimodal embedding space between the image embedding for the digital image and the cross-lingual-multimodal embedding for the query by: identifying a plurality of image embeddings within the multimodal embedding space, the plurality of image embeddings comprising the image embedding for the digital image; and determining that the image embedding for the digital image is closer to the cross-lingual-multimodal embedding for the query within the multimodal embedding space than other image embeddings from the plurality of image embeddings.

In one or more embodiments, the series of acts 1000 includes acts for generating image embeddings for digital images. For example, in some implementations, the acts include generating, utilizing an image-embedding model and within the multimodal embedding space, a plurality of image embeddings corresponding to a plurality of digital images prior to receiving the query, the plurality of image embeddings comprising the image embedding for the digital image; and storing the plurality of image embeddings within data storage for access in response to receiving queries.

In some implementations, the series of acts 1000 further includes acts for receiving additional queries. For example, in one or more embodiments, the acts include receiving, from an additional client device, an additional query comprising additional text in an additional language from the multiple languages, the additional text in the additional language corresponding to the text from the query in the language; generate, utilizing the cross-lingual-multimodal-embedding model and within the multimodal embedding space, an additional cross-lingual-multimodal embedding for the additional text from the additional query; and determine that the digital image corresponds to the additional text based on an additional embedding distance between the image embedding for the digital image and the cross-lingual-multimodal embedding for the additional text within the multimodal embedding space.

More generally speaking, in some embodiments, the series of acts 1000 include receiving, from additional client devices, additional queries comprising additional texts in a first additional language and a second additional language from the multiple languages, the additional texts in the first and second additional languages corresponding to the text from the query in the language; generating, utilizing the cross-lingual-multimodal-embedding model and within the multimodal embedding space, additional cross-lingual-multimodal embeddings for the additional texts from the additional queries; and determining that the digital image corresponds to the additional texts based on additional embedding distances among the image embedding for the digital image and the cross-lingual-multimodal embeddings for the additional texts within the multimodal embedding space.

In one or more embodiments, the series of acts 1000 also includes acts for learning parameters for a cross-lingual-multimodal-embedding model. For example, in some implementations, the acts include identifying a positive image and a positive text for the positive image in a sample language and a negative image and a negative text for the negative image in the sample language; generating, utilizing the image-embedding model and within a multimodal embedding space for image embeddings and cross-lingual-multimodal embeddings of multiple languages, a positive-image embedding for the positive image and a negative-image embedding for the negative image; generating, utilizing the cross-lingual-multimodal-embedding model and within the multimodal embedding space, a positive cross-lingual-multimodal embedding for the positive text and a negative cross-lingual-multimodal embedding for the negative text; determining embedding distances in the multimodal embedding space among the positive cross-lingual-multimodal embedding, the negative cross-lingual-multimodal embedding, the positive-image embedding, and the negative-image embedding; and modifying, based on the embedding distances in the multimodal embedding space, parameters of the cross-lingual-multimodal-embedding model to learn to retrieve digital images based on text queries in the multiple languages.

In some embodiments, the cross-lingual image search system 106 generates the positive-image embedding for the positive image and the negative-image embedding for the negative image by generating the positive-image embedding having a set of dimensions corresponding to an output of the image-embedding model and the negative-image embedding having the set of dimensions.

In some instances, the cross-lingual image search system 106 generates the positive cross-lingual-multimodal embedding for the positive text and the negative cross-lingual-multimodal embedding for the negative text by utilizing one or more neural network layers within the cross-lingual-multimodal-embedding model to transform a positive-text embedding for the positive text and a negative-text embedding for the negative text to conform to the set of dimensions corresponding to the output of the image-embedding model and into the positive cross-lingual-multimodal embedding and the negative cross-lingual-multimodal embedding. For example, in one or more embodiments, the cross-lingual image search system 106 generates the positive cross-lingual-multimodal embedding for the positive text and the negative cross-lingual-multimodal embedding for the negative text by: generating, utilizing a cross-lingual-text encoder of the cross-lingual-multimodal-embedding model and within a cross-lingual embedding space for text embeddings of the multiple languages, a positive-text embedding for the positive text and a negative-text embedding for the negative text; and transforming, utilizing one or more neural network layers of the cross-lingual-multimodal-embedding model, the positive-text embedding into the positive cross-lingual-multimodal embedding within the multimodal embedding space and the negative-text embedding into the negative cross-lingual-multimodal embedding within the multimodal embedding space.

In some embodiments, the image positive and negative texts comprise image descriptions. Further, in some embodiments, the text embeddings comprise sentence-level embeddings. To illustrate, in one or more embodiments, the cross-lingual image search system 106 identifies the positive text for the positive image and the negative text for the negative image by identifying a positive-image description in the sample language and a negative-image description in the sample language; and generates the positive cross-lingual-multimodal embedding for the positive text and the negative cross-lingual-multimodal embedding for the negative text by determining, utilizing a cross-lingual-text encoder of the cross-lingual-multimodal-embedding model and within a cross-lingual embedding space for text embeddings of the multiple languages, a positive sentence-level embedding for the positive-image description and a negative sentence-level embedding for the negative-image description. In some implementations, generating the positive cross-lingual-multimodal embedding for the positive text and the negative cross-lingual-multimodal embedding for the negative text includes: generating, utilizing one or more neural network layers of the cross-lingual-multimodal-embedding model and within the multimodal embedding space, the positive cross-lingual-multimodal embedding for the positive-image description based on the positive sentence-level embedding; and generating, utilizing the one or more neural network layers of the cross-lingual-multimodal-embedding model and within the multimodal embedding space, the negative cross-lingual-multimodal embedding for the negative-image description based on the negative sentence-level embedding.

In some instances, the cross-lingual image search system 106 determines the embedding distances in the multimodal embedding space among the positive cross-lingual-multimodal embedding, the negative cross-lingual-multimodal embedding, the positive-image embedding, and the negative-image embedding by: determining a first embedding distance between the positive cross-lingual-multimodal embedding and the positive-image embedding; determining a second embedding distance between the positive cross-lingual-multimodal embedding and the negative cross-lingual-multimodal embedding; and determining a third embedding distance between the positive cross-lingual-multimodal embedding and the negative-image embedding.

In one or more embodiments, the cross-lingual image search system 106 further determines, utilizing a multimodal metric loss function, a multimodal metric loss based on the embedding distances in the multimodal embedding space, a sensitivity parameter, a first scaling factor, and a second scaling factor. Accordingly, the cross-lingual image search system 106 modifies, based on the embedding distances within the multimodal embedding space, the parameters of the cross-lingual-multimodal-embedding model by modifying the parameters of the cross-lingual-multimodal-embedding model based on the multimodal metric loss.

In some embodiments, the cross-lingual image search system 106 modifies the parameters of the cross-lingual-multimodal-embedding model to learn to retrieve the digital images based on the text queries by modifying one or more parameters of neural network layers within the cross-lingual-multimodal-embedding model, such as the one or more neural network layers mentioned above.

In one or more embodiments, the acts include performing multiple iterations of modifying parameters of the cross-lingual-multimodal embedding model to improve the performance of the cross-lingual-multimodal embedding model. For example, in one or more embodiments, the acts include iteratively modifying the parameters of the cross-lingual-multimodal-embedding model to: decrease embedding distances in the multimodal embedding space between positive cross-lingual-multimodal embeddings for positive texts and positive-image embeddings for positive images; increase embedding distances in the multimodal embedding space between the positive cross-lingual-multimodal embeddings for the positive texts and negative-image embeddings for negative images; and increase embedding distances between the positive cross-lingual-multimodal embeddings for the positive texts and negative cross-lingual-multimodal embeddings for negative texts.

Further, in some embodiments, the acts include receiving a query comprising text in an additional language from the multiple languages that differs from the sample language; generate, utilizing the cross-lingual-multimodal-embedding model and within the multimodal embedding space, a cross-lingual-multimodal embedding for the text from the query; and determining a digital image that corresponds to the query based on an embedding distance within the multimodal embedding space between an image embedding for the digital image and the cross-lingual-multimodal embedding for the text.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
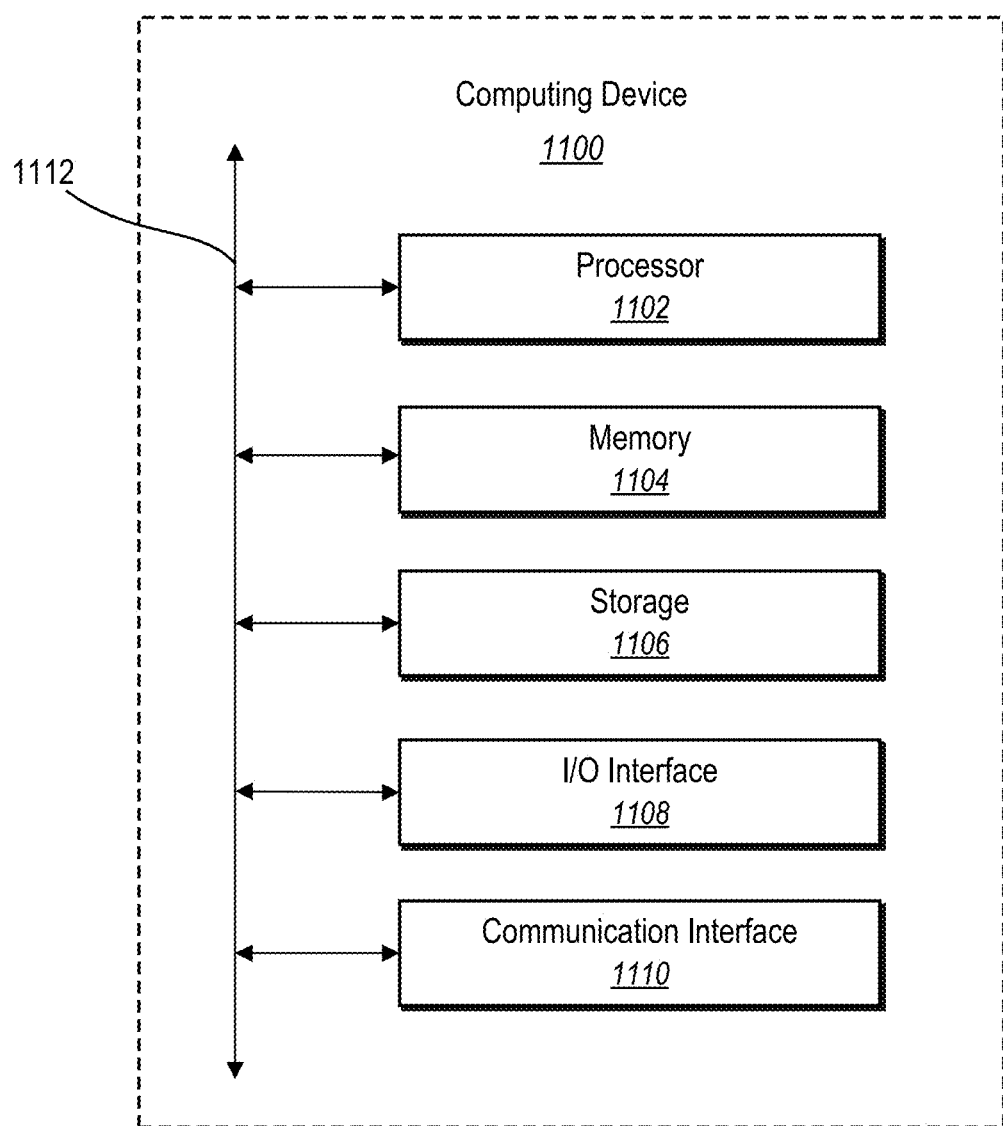
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102, the client devices 110a-110n, and/or the third-party server 114). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to perform operations comprising:
receiving, from a client device, a query comprising text in a language from multiple languages;
generating, utilizing a cross-lingual-text encoder of a cross-lingual-multimodal-embedding model, a text embedding for the text from the query within a cross-lingual embedding space;
generating, utilizing one or more neural network layers of the cross-lingual-multimodal-embedding model and within a multimodal embedding space for image embeddings and cross-lingual-multimodal embeddings of the multiple languages, a cross-lingual-multimodal embedding from the text embedding from the cross-lingual embedding space that corresponds to the text from the query, the cross-lingual-multimodal-embedding model comprising parameters modified to reduce embedding distances between cross-lingual-multimodal embeddings for image texts and positive-image embeddings for corresponding positive images and to increase embedding distances between the cross-lingual-multimodal embeddings and negative-image embeddings for non-corresponding negative images;
determining an image embedding for a digital image corresponding to the text from the query based on an embedding distance within the multimodal embedding space between the cross-lingual-multimodal embedding for the text and the image embedding; and
in response to the query, retrieving the digital image for display on the client device.

2. The non-transitory computer-readable medium of claim 1, wherein:
generating the text embedding for the text from the query within the cross-lingual embedding space utilizing the cross-lingual-text encoder of the cross-lingual-multimodal-embedding model comprises generating, utilizing the cross-lingual-text encoder of the cross-lingual-multimodal-embedding model and within the cross-lingual embedding space for text embeddings of the multiple languages, a sentence-level embedding for the text from the query; and
generating the cross-lingual-multimodal embedding from text embedding utilizing the one or more neural network layers of the cross-lingual-multimodal-embedding model by comprises transforming, utilizing the one or more neural network layers of the cross-lingual-multimodal-embedding model, the sentence-level embedding into the cross-lingual-multimodal embedding within the multimodal embedding space.

3. The non-transitory computer-readable medium of claim 2, wherein:
generating the sentence-level embedding for the text from the query comprises generating the sentence-level embedding having a set of dimensions that differs from a set of dimensions corresponding to the multimodal embedding space; and
transforming the sentence-level embedding into the cross-lingual-multimodal embedding comprises transforming the sentence-level embedding to conform to the set of dimensions corresponding to the multimodal embedding space and into the cross-lingual-multimodal embedding.

4. The non-transitory computer-readable medium of claim 1, further comprising instructions that, when executed by the at least one processor, cause the at least one processor to perform operations comprising:
receiving, from an additional client device, an additional query comprising additional text in an additional language from the multiple languages, the additional text in the additional language corresponding to the text from the query in the language;
generating, utilizing the cross-lingual-multimodal-embedding model and within the multimodal embedding space, an additional cross-lingual-multimodal embedding for the additional text from the additional query; and
determining that the digital image corresponds to the additional text based on an additional embedding distance between the image embedding for the digital image and the cross-lingual-multimodal embedding for the additional text within the multimodal embedding space.

5. The non-transitory computer-readable medium of claim 1, wherein determining the image embedding for the digital image corresponding to the text from the query based on the embedding distance within the multimodal embedding space between the cross-lingual-multimodal embedding for the text and the image embedding comprises determining the image embedding is closer to the cross-lingual-multimodal embedding within the multimodal embedding space than other image embeddings within the multimodal embedding space.

6. The non-transitory computer-readable medium of claim 1, further comprising instructions that, when executed by the at least one processor, cause the at least one processor to perform operations comprising:
generating, utilizing an image-embedding model and within the multimodal embedding space, a plurality of image embeddings corresponding to a plurality of digital images prior to receiving the query, the plurality of image embeddings comprising the image embedding for the digital image; and
storing the plurality of image embeddings within data storage for access in response to receiving queries.

7. The non-transitory computer-readable medium of claim 1, wherein receiving the query comprising the text in the language from the multiple languages comprises receiving the query comprising the text in the language differing from a sample language corresponding to the image texts upon which the parameters of the cross-lingual-multimodal-embedding model were modified.

8. A system comprising:
at least one memory device comprising a cross-lingual-multimodal-embedding model and an image-embedding model; and
at least one server device configured to cause the system to:
identify a positive image and a positive text for the positive image in a sample language and a negative image and a negative text for the negative image in the sample language;
generate, utilizing the image-embedding model and within a multimodal embedding space for image embeddings and cross-lingual-multimodal embeddings of multiple languages, a positive-image embedding for the positive image and a negative-image embedding for the negative image;
generate, utilizing a cross-lingual-text encoder of the cross-lingual-multimodal-embedding model and within a cross-lingual embedding space, a positive-text embedding for the positive text and a negative-text embedding for the negative text;
generate, utilizing one or more neural network layers of the cross-lingual-multimodal-embedding model and within the multimodal embedding space, a positive cross-lingual-multimodal embedding from the positive-text embedding within the cross-lingual embedding space and a negative cross-lingual-multimodal embedding from the negative-text embedding within the cross-lingual embedding space;
determine embedding distances in the multimodal embedding space among the positive cross-lingual-multimodal embedding, the negative cross-lingual-multimodal embedding, the positive-image embedding, and the negative-image embedding; and
modify, based on the embedding distances in the multimodal embedding space, parameters of the cross-lingual-multimodal-embedding model to learn to retrieve digital images based on text queries in the multiple languages.

9. The system of claim 8, wherein the at least one server device is further configured to cause the system to:
generate the positive-text embedding for the positive text and the negative-text embedding for the negative text utilizing the cross-lingual-multimodal-embedding model by generating, utilizing a cross-lingual-text encoder of the cross-lingual-multimodal-embedding model and within the cross-lingual embedding space for text embeddings of the multiple languages, the positive-text embedding for the positive text and the negative-text embedding for the negative text; and
generate the positive cross-lingual-multimodal embedding from the positive-text embedding and the negative cross-lingual-multimodal embedding from the negative-text embedding utilizing the cross-lingual-multimodal-embedding model by transforming, utilizing one or more neural network layers of the cross-lingual-multimodal-embedding model, the positive-text embedding into the positive cross-lingual-multimodal embedding within the multimodal embedding space and the negative-text embedding into the negative cross-lingual-multimodal embedding within the multimodal embedding space.

10. The system of claim 8, wherein the at least one server device is further configured to cause the system to:
generate the positive-image embedding for the positive image and the negative-image embedding for the negative image by generating the positive-image embedding having a set of dimensions corresponding to an output of the image-embedding model and the negative-image embedding having the set of dimensions; and
generate the positive cross-lingual-multimodal embedding from the positive-text embedding and the negative cross-lingual-multimodal embedding from the negative-text embedding by utilizing one or more neural network layers within the cross-lingual-multimodal-embedding model to transform the positive-text embedding for the positive text and negative-text embedding for the negative text to conform to the set of dimensions corresponding to the output of the image-embedding model and into the positive cross-lingual-multimodal embedding and the negative cross-lingual-multimodal embedding.

11. The system of claim 8, wherein the at least one server device is further configured to cause the system to:
identify the positive text for the positive image and the negative text for the negative image by identifying a positive-image description in the sample language and a negative-image description in the sample language; and
generate the positive-text embedding for the positive text and the negative-text embedding for the negative text utilizing the cross-lingual-multimodal-embedding model by determining, utilizing a cross-lingual-text encoder of the cross-lingual-multimodal-embedding model and within a cross-lingual embedding space for text embeddings of the multiple languages, a positive sentence-level embedding for the positive-image description and a negative sentence-level embedding for the negative-image description.

12. The system of claim 11, wherein the at least one server device is further configured to cause the system to generate the positive cross-lingual-multimodal embedding from the positive-text embedding and the negative cross-lingual-multimodal embedding from the negative-text embedding utilizing the cross-lingual-multimodal-embedding model by:
generating, utilizing one or more neural network layers of the cross-lingual-multimodal-embedding model and within the multimodal embedding space, the positive cross-lingual-multimodal embedding for the positive-image description based on the positive sentence-level embedding; and generating, utilizing the one or more neural network layers of the cross-lingual-multimodal-embedding model and within the multimodal embedding space, the negative cross-lingual-multimodal embedding for the negative-image description based on the negative sentence-level embedding.

13. The system of claim 8, wherein the at least one server device is further configured to cause the system to modify the parameters of the cross-lingual-multimodal-embedding model to learn to retrieve the digital images based on the text queries by modifying one or more parameters of neural network layers within the cross-lingual-multimodal-embedding model.

14. The system of claim 8, wherein the at least one server device is further configured to cause the system to determine the embedding distances in the multimodal embedding space among the positive cross-lingual-multimodal embedding, the negative cross-lingual-multimodal embedding, the positive-image embedding, and the negative-image embedding by:
   determining a first embedding distance between the positive cross-lingual-multimodal embedding and the positive-image embedding;
   determining a second embedding distance between the positive cross-lingual-multimodal embedding and the negative cross-lingual-multimodal embedding; and
   determining a third embedding distance between the positive cross-lingual-multimodal embedding and the negative-image embedding.

15. The system of claim 8, wherein the at least one server device is further configured to cause the system to:
   determine, utilizing a multimodal metric loss function, a multimodal metric loss based on the embedding distances in the multimodal embedding space, a sensitivity parameter, a first scaling factor, and a second scaling factor; and
   modify, based on the embedding distances within the multimodal embedding space, the parameters of the cross-lingual-multimodal-embedding model by modifying the parameters of the cross-lingual-multimodal-embedding model based on the multimodal metric loss.

16. The system of claim 8, wherein the at least one server device is further configured to cause the system to iteratively modify the parameters of the cross-lingual-multimodal-embedding model to:
   decrease embedding distances in the multimodal embedding space between positive cross-lingual-multimodal embeddings for positive texts and positive-image embeddings for positive images;
   increase embedding distances in the multimodal embedding space between the positive cross-lingual-multimodal embeddings for the positive texts and negative-image embeddings for negative images; and
   increase embedding distances between the positive cross-lingual-multimodal embeddings for the positive texts and negative cross-lingual-multimodal embeddings for negative texts.

17. The system of claim 8, wherein the at least one server device is further configured to cause the system to:
   receive a query comprising text in an additional language from the multiple languages that differs from the sample language;
   generate, utilizing the cross-lingual-multimodal-embedding model and within the multimodal embedding space, a cross-lingual-multimodal embedding for the text from the query; and
   determine a digital image that corresponds to the query based on an embedding distance within the multimodal embedding space between an image embedding for the digital image and the cross-lingual-multimodal embedding for the text.

18. A computer-implemented method comprising:
   receiving, from a client device, a query comprising text in a language from multiple languages;
   generating, utilizing a cross-lingual-text encoder of a cross-lingual-multimodal-embedding model, a text embedding for the text from the query within a cross-lingual embedding space;
   generating, utilizing one or more neural network layers of the cross-lingual-multimodal-embedding model and within a multimodal embedding space for image embeddings and cross-lingual-multimodal embeddings of the multiple languages, a cross-lingual-multimodal embedding from the text embedding within the cross-lingual embedding space that corresponds to the text from the query; and
   determining, for display on the client device, a digital image that corresponds to the query based on an embedding distance within the multimodal embedding space between an image embedding for the digital image and the cross-lingual-multimodal embedding for the query.

19. The computer-implemented method of claim 18, wherein determining, for display on the client device, the digital image that corresponds to the query based on the embedding distance within the multimodal embedding space between the image embedding for the digital image and the cross-lingual-multimodal embedding for the query comprises:
   identifying a plurality of image embeddings within the multimodal embedding space, the plurality of image embeddings comprising the image embedding for the digital image; and
   determining that the image embedding for the digital image is closer to the cross-lingual-multimodal embedding for the query within the multimodal embedding space than other image embeddings from the plurality of image embeddings.

20. The computer-implemented method of claim 18, further comprising:
   receiving, from additional client devices, additional queries comprising additional texts in a first additional language and a second additional language from the multiple languages, the additional texts in the first additional language and the second additional language corresponding to the text from the query in the language;
   generating, utilizing the cross-lingual-multimodal-embedding model and within the multimodal embedding space, additional cross-lingual-multimodal embeddings for the additional texts from the additional queries; and
   determining that the digital image corresponds to the additional texts based on additional embedding distances among the image embedding for the digital image and the additional cross-lingual-multimodal embeddings for the additional texts within the multimodal embedding space.

* * * * *